US008861426B2

(12) United States Patent
Lim et al.

(10) Patent No.: US 8,861,426 B2
(45) Date of Patent: Oct. 14, 2014

(54) PATH SWITCHING SYSTEM, PATH SWITCHING METHOD, AND MOBILE TERMINAL

(75) Inventors: Chun Keong Benjamin Lim, Singapore (SG); Chan Wah Ng, Singapore (SG); Mohana Dhamayanthi Jeyatharan, Singapore (SG); Hong Cheng, Singapore (SG); Keigo Aso, Kanagawa (JP); Takahisa Aoyama, Kanagawa (JP); Shinkichi Ikeda, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 142 days.

(21) Appl. No.: 13/640,308

(22) PCT Filed: Apr. 13, 2011

(86) PCT No.: PCT/JP2011/002177
§ 371 (c)(1),
(2), (4) Date: Oct. 9, 2012

(87) PCT Pub. No.: WO2011/129107
PCT Pub. Date: Oct. 20, 2011

(65) Prior Publication Data
US 2013/0028172 A1    Jan. 31, 2013

(30) Foreign Application Priority Data

Apr. 16, 2010  (JP) ................................. 2010-095492
Nov. 11, 2010  (JP) ................................. 2010-252467

(51) Int. Cl.
| H04B 7/14 | (2006.01) |
| H04W 36/12 | (2009.01) |
| H04W 88/16 | (2009.01) |
| H04W 84/04 | (2009.01) |
| H04W 76/02 | (2009.01) |

(52) U.S. Cl.
CPC .............. *H04W 36/12* (2013.01); *H04W 88/16* (2013.01); *H04W 84/047* (2013.01); *H04W 76/02* (2013.01)

USPC .......................................................... 370/315

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| 2008/0112365 A1* | 5/2008 | Kwun et al. .................. 370/332 |
| 2008/0181178 A1* | 7/2008 | Shaheen ...................... 370/331 |

(Continued)

FOREIGN PATENT DOCUMENTS

WO    2010041440 A1    4/2010

OTHER PUBLICATIONS

Stewart, "Stream Control Transmission Protocol," Network Working Group, Request for Comments: 4960, Obsoletes: 2690, 3309, Category: Standards Track, Sep. 2007, 153 pages.

(Continued)

*Primary Examiner* — Jung-Jen Liu
(74) *Attorney, Agent, or Firm* — Seed IP Law Group PLLC

(57) ABSTRACT

A path switching system is provided, in which when UE has been offloaded from a first PDN-GW to a second PDN-GW, if there is an additional connection of the UE to the first PDN-GW, processing related to the additional connection can be performed on the UE side. The system includes: a control unit for sending a mobile terminal a message including information indicative of having switched relay devices, which relay a packet between the mobile terminal and a communication device, from a first relay device to a second relay device; and the mobile terminal for determining whether there is an added path other than part of a path from the mobile device before movement to the communication device and capable of being managed by the control unit, established between the mobile terminal and the first relay device, and when there is the added path, performing processing on the added path.

3 Claims, 14 Drawing Sheets

(56) References Cited

U.S. PATENT DOCUMENTS

2009/0129274 A1* 5/2009 Guillouard et al. ............ 370/235
2009/0252078 A1* 10/2009 Lim et al. ...................... 370/315
2010/0087196 A1* 4/2010 Lee et al. ....................... 455/436
2010/0322194 A1* 12/2010 Hu et al. ........................ 370/331

OTHER PUBLICATIONS

Haley et al., "Mobility Header Home Agent Switch Message," Network Working Group, Request for Comments: 5142, Category: Standards Track, Jan. 2008, 14 pages.

Wakikawa et al., "Multiple Care-of Addresses Registration," Network Working Group, Request for Comments: 5648, Category: Standards Track, Oct. 2009, 37 pages.

"3rd Generation Partnership Project; Technical Specification Group Services and System Aspects Service aspects; Service Principles (Release 10)," 3GPP TS 22.101 10.1.0, Dec. 2009, 60 pages.

"3rd Generation Partnership Project; Technical Specification Group Core Network and Terminals; Non-Access-Stratum (NAS) protocol for Evolved Packet System (EPS); Stage 3 (Release 9)," 3GPP TS 24.301 V9.1.0, Dec. 2009, 285 pages.

"3rd Generation Partnership Project; Technical Specification Group Core Network and Terminals; Access to the 3GPP Evolved Packet Core (EPC) via non-3GPP access networks; Stage 3 (Release 9)," 3GPP TS 24.302 V9.1.1, Dec. 2009, 52 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 9)," 3GPP TS 23.401 V9.3.0, Dec. 2009, 254 pages.

"3rd Generation Partnership Project; Technical Specification Group Services and System Aspects; IP Flow Mobility and seamless WLAN offload; Stage 2 (Release 10)," 3GPP TS 23.261 V0.3.0, Mar. 2010, 20 pages.

International Search Report for corresponding International Application No. PCT/JP2011/002177, 2 pages.

* cited by examiner

FIG. 8
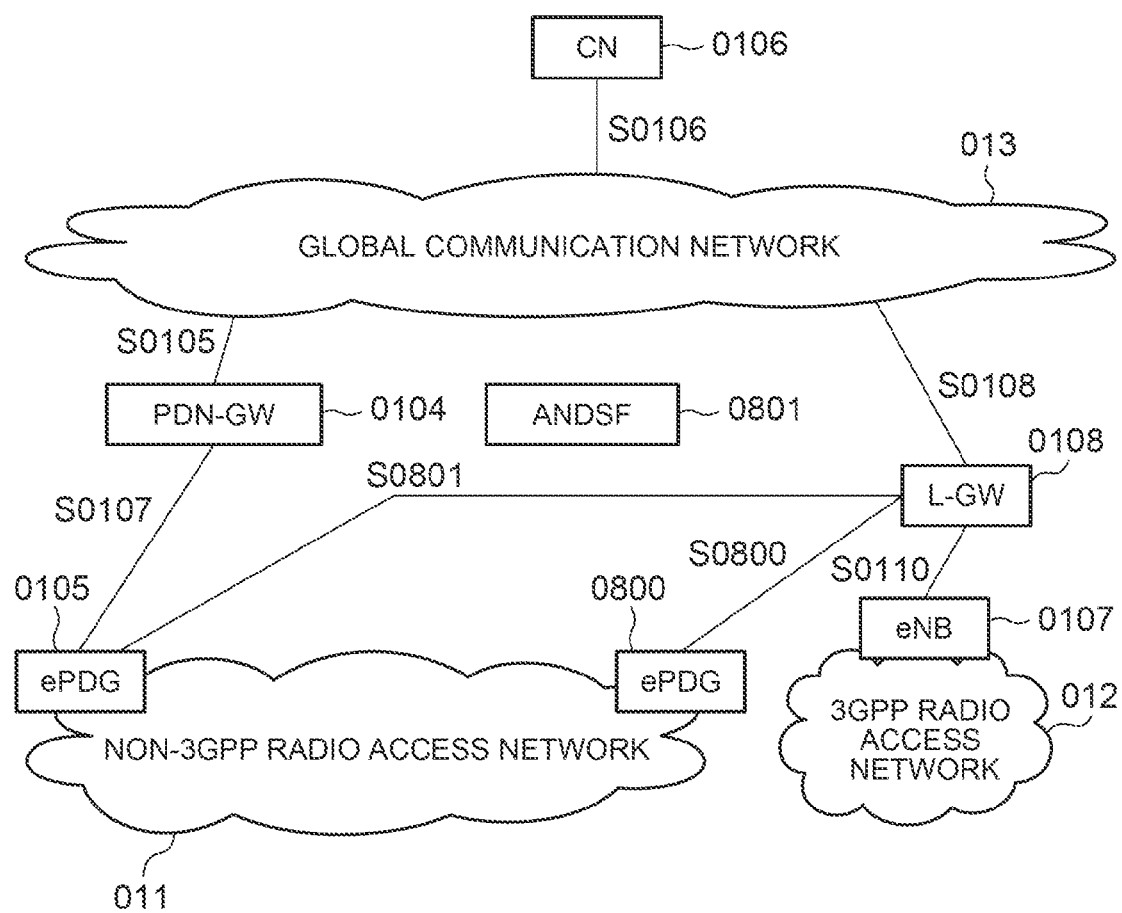
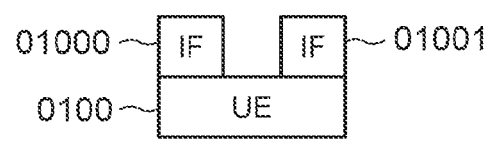

PATH SWITCHING SYSTEM, PATH SWITCHING METHOD, AND MOBILE TERMINAL

TECHNICAL FIELD

The present invention relates to the field of telecommunications for packet exchange data communication networks, and particularly to a path switching system, a path switching method, and mobile terminal for switching paths to exchange packets between the mobile terminal and a communication device as a communication partner according to movement of the mobile terminal.

BACKGROUND ART

The Third Generation Partnership Project (3GPP) has developed the standard for a system, newly named as EPS (Evolved Packet System), in which a long term evolution (LTE) program provides improved spectral efficiency, reduced latency, and improvement in use of radio resources. The EPS allows users to experience high data-rate and abundant applications and services at lower cost than before. To obtain connectivity to the EPS, users have to get user equipment (UE) based on LTE. From the recent market trends, it has been considered that the UE would support multiple different radio technologies. For example, all of cellular phones have at least a wireless cellular interface for accessing a mobile cellular network. Among these cellular phones, the number of cellular phones having an IEEE 802.11 wireless interface capable of accessing a wireless local area network (WLAN) has been increasing.

FIG. 1 shows a system described in the Third Generation Partnership Project (3GPP). In this system, UE 0100 obtains connectivity to a global communication network 013 through a wireless cellular interface (IF 01000). The IF 01000 communicates with eNB 0101 (Enhanced Node B) as a base station in connection with a 3GPP radio access network 010. The 3GPP radio access network may be, but not limited to, a UMTS Radio Access Network (UTRAN) or an E-UTRAN (Evolved UTRAN). The eNB 0101 has a signaling path (S0101) provided with a Mobility Management Entity (MME 0102). The eNB 0101 performs radio resource management and admission control on the UE 0100.

Further, the eNB 0101 performs header compression, encryption, and reliable packet delivery. The MME 0102 performs idle-mode mobility signaling for the UE 0100. This includes tracking and paging for the UE 0100. Further, the MME 0102 executes bearer activation/deactivation processes for the UE 0100. For this technique, a bearer is an information transmission path of defined capacity, delay or bit error rate. Through a signaling path S0101, the eNB 0101 can carry control information, such as the location of the UE 0100, or a request message from the UE 0100. When transmitting data to the global communication network 013, the UE 0100 needs to establish a data path. The MME 0102 uses a signaling path (S0103) provided with a serving gateway (S-GW 0103) to set a data communication path (S0102) toward the IF 01000 of the UE 0100. The signaling path S0102 between the eNB 0101 and the S-GW 0103 enables the transmission of data packets from the UE 0100.

The S-GW 0103 assists in rouging user data packets. Further, the S-GW 0103 serves as a mobility anchor point for the user plane during handover between different access systems. A packet data network gateway (PDN-GW 0104) provides, to the UE 0100, the connectivity to an external packet data network. The PDN-GW 0104 also has the ability to route user data packets based on a filtering rule (routing rule) described by the UE 0100. The S-GW 0103 sets up a data path for the UE 0100 using a signaling path S0104. When the UE 0100 transmits a data packet from the IF 01000 to a correspondent node (CN 0106), the data packet passes through the signaling paths S0102, S0104, S0105, and S0106. In this system, the correspondent node (CN 0106) is an entity performing end-to-end data communication with the UE 0100. As an example, data traffic between the UE 0100 and the CN 0106 is a flow of teleconference calls including video packet streams and voice packet streams. The CN 0106 uses the data path S0106 to communicate with the global communication network 013. When UMTS is used, eNB is replaced with RNC/BSC, MME is replaced with SGSN, and PGW is replaced with GGSN.

Further, the UE 0100 can establish another connection to the global communication network 013 through the wireless interface (IF 01001) for the wireless local area network (WLAN). The IF 01001 may be, but not limited to, any non-3GPP wireless interface, such as an IEEE 802.11 interface, a WiMAX interface, or a cdma 2000 High Rate Packet Data (HRPD) interface. The IF 01001 communicates with an ePDG 0105 (Evolved Packet Data Gateway) in connection with a non-3GPP radio access network 011. The non-3GPP radio access network may be, but not limited to, WLAN, WiMAX, or HRPD. The ePDG 0105 sets up a signaling path S0107 to the PDN-GW 0104 so that the UE 0100 can transmit data to the CN 0106.

In this system, a protocol for the UE 0100 to connect to the PDN-GW 0104 simultaneously on the 3GPP radio access network and on the non-3GPP radio access network uses an extended function of dual stack mobile IPv6 (DSMIPv6) (See Non-Patent Document 1). Using a binding identifier (BID), the UE 0100 can uniquely identify both the IF 01000 connection and the IF 01001 connection to the PDN-GW 0104. The BID is carried on a binding update (BU) message from the UE 0100 to the PDN-GW 0104. The BU message is a periodic update message sent from the UE 0100 to the PDN-GW 0104 to inform the PDN-GW 0104 that the UE 0100 remains connected. Therefore, the PDN-GW 0104 operating as a home agent (HA) for the UE 0100 has two possible packet forwarding paths to the UE 0100. A first path is signaling data paths S0104 and S0102. A second path is a signaling data path S0107.

When roaming around in a communication network, the UE 0100 as a mobile terminal can connect the IF 01000 to a different eNB. Referring again to FIG. 1, the IF 01000 can leave the communication area of the 3GPP radio access network 010 to move into the communication area of a 3GPP radio access network 012. To this end, the IF 01000 is associated with an eNB 0107. In the 3GPP, many discussions have been held on the idea that a telecommunications carrier performs selective IP traffic offload (SIPTO) (See Non-Patent Document 2). SIPTO as a function discussed in a framework called Release 10 in the 3GPP enables the UE to offload to another PDN-GW based on the location of the UE. This PDN-GW has the capability to transmit data packets from the UE directly to the global communication network 013 without passing through a core network of a cellular communications operator (offload path or local breakout path). Such an offload scheme enables the cellular communications operator to make effective use of precious radio resources thereof.

Referring again to FIG. 1, a local PDN-GW (L-GW 0108) has the functions as an S-GW and a PDN-GW. The L-GW 0108 is connected to the eNB 0107 through a signaling path S0110. The function of the L-GW 0108 enables the transmission of data packets from the UE 0100 to the global communication network 013 through a signaling path S0108. This is called breakout in the 3GPP. In this state, the data packets from the UE are transmitted promptly to the global communication network 013 without passing through the core network of the telecommunications carrier. This can lead to the saving of resources of the telecommunications carrier in the core network. It is considered that the offload from the UE to the PDN-GW is triggered by the MME 0102. In FIG. 1, it is assumed that the L-GW 0108 has both functions as the S-GW and the PDN-GW, but another entity having the function as the S-GW may exist between the L-GW 0108 and the eNB 0107. Further, the L-GW 0108 may be a normal PDN-GW existing in the core network. In this case, the advantage of offload from the PDN-GW 0104 is that the processing load on the PDN-GW 0104 or the S-GW 0103 can be dispersed.

The MME 0102 is the best candidate because it can recognize the location of the UE 0100 necessary to decide on the best timing of triggering the offload. When detecting that the UE 0100 can be offloaded, the MME 0102 sends a signal of such an intention to the eNB 0107 through a signaling path S0109. The reason for the MME 0102 to trigger such offload is that the cellular communications operator detects that the consumption of the radio resources reaches a constraining point and thinks of allocating part of the resources of the UE to a PDN-GW capable of transmitting data packets from the UE to the global communication network 013 without going through many networks of the cellular communications operator to release the resources, but it is not limited thereto. Similarly, the MME 0102 signals the L-GW 0108 to establish a PDN connection for the UE 0100 through S0111.

There are some existing methods of offloading the UE to another PDN-GW. On the 3GPP radio access network, the MME 0102 can try to disconnect the PDN connection to the IF 01000 of the UE 0100. The MME 0102 can perform a detach procedure or bearer deactivation procedure described in Non-Patent Document 3. The MME 0102 requests the IF 01000 to reestablish the connection to the PDN-GW 0104 through a message from the MME 0102 to the IF 01000. When the IF 01000 executes the PDN connectivity request, the MME 0102 selects the L-GW 0108. Thus, the MME 0102 offloads the IF 01000 from the PDN-GW 0104 to the L-GW 0108. Similarly, the MME 0102 negotiates the termination of the data signaling paths (S0102 and S0104) to the IF 01000.

On the non-3GPP radio access network, the PDN-GW 0104 can try to offload the IF 01001 of the UE 0100 to the L-GW 0108. The PDN-GW 0104 can perform a home agent (HA) relocation procedure described in Non-Patent Document 4. The IF 01001 receives, from the PDN-GW 0104, a message indicative of the L-GW 0108 as a new HA for the UE 0100. The IF 01001 tries to disconnect the connection to the PDN-GW 0104 and establish a connection to the L-GW 0108. Thus, the PDN-GW 0104 offloads the IF 01001 from the PDN-GW 0104 to the L-GW 0108.

It is apparent from the description so far that separate entities manage the mobility of the interfaces of the UE on the access networks in the 3GPP system. The MME monitors the location of the UE in connection with the mobility of the cellular interface of the UE on the 3GPP radio access network. The PDN-GW monitors the location of the UE in connection with the mobility of the WLAN interface of the UE on the non-3GPP radio access network. In the 3GPP system, since the MME and the PDN-GW do not work with each other, a problem may arise when the MME triggers the offload of the UE to another PDN-GW. Referring to FIG. 1, it is assumed that the 3GPP radio access signaling data paths (S0102 and S0104) and the non-3GPP radio access signaling data path (S0107) start congesting due to a lot of signaling thereon. At this point, the MME 0102 triggers the offload of the IF 01000 from the PDN-GW 0104 to the L-GW 0108 to reduce congestion on the signaling data paths (S0102 and S0104). Offload to an uncongested signaling paths (S0110 and S0108) removes a packet delivery delay or jitter of the current session (i.e., teleconference calls) of the UE 0100.

However, the MME 0102 is unaware that the UE 0100 has the IF 01001 connected to the PDN-GW 0104 on the non-3GPP radio access network 011. When the MME 0102 signals the S-GW 0103 to terminate (drop) the signaling path S0102 to the IF 01000, there is no indication that this termination is caused by the offload of the UE 0100 to another PDN-GW by means of the MME 0102. The lack of this indication is the same as in the S-GW 0103. The S-GW 0103 does not inform the PDN-GW 0104 that the termination of the data signaling path S0104 is caused by the offload of the UE 0100 to another PDN-GW by means of the MME 0102. Therefore, the PDN-GW 0104 managing the mobility of the IF 01001 of the UE 0100 will not trigger the HA relocation procedure for moving the HA being connected to the IF 01001 to the L-GW 0108. Since the signaling path S0107 exists, the PDN-GW 0104 can continue to forward data packets from the UE 0100, causing the UE 0100 to continue the congested paths. For ease of understanding, this problem will be described with the following example.

When the UE 0100 and the CN 0106 are in connection with each other to establish communication with a teleconference system, it is assumed that this communication consists of components of a voice session and a video session. The teleconference communication is destined to a UE home address (HoA) serving as an anchoring address of the UE 0100. Since the CN 0106 transmits data packets of the teleconference communication to the HoA, the CN 0106 does not recognize the mobility of the UE. The UE 0100 can get data packets transmitted from the CN 0106 regardless of the roaming destination of the UE 0100. If either of paths between the PDN-GW 0104 and the UE 0100 is disconnected, the PDN-GW 0104 will use the other path to forward the data packets to the UE 0100.

Since voice needs a certain quality of service (QoS), the UE 0100 has a filter rule to send voice packets toward the IF 01000 on a 3GPP radio access network. For video packets that do not require the QoS, the UE 0100 has a filter rule to send video packets toward the IF 01001 on a non-3GPP radio access network. When the IF 0100 is offloaded to the L-GW 0108, the signaling paths (S0102 and S0104) between the PDN-GW 0104 and the IF 01000 are disconnected by the UE 0100. However, the signaling path S0107 remains, and therefore, the PDN-GW 0104 can still forward both the voice and video packets to the IF 01001. Since the QoS for the voice packets is not provided to the signaling path S0107, some slight delay and jitter occur in the teleconference communication. For example, both parties concerned feel that the relationship between conversation and images is disrupted. The quality of user's call is degraded, and in some cases, this leads to an income loss for the cellular communications operator.

Patent Document 1 describes a method for UE to notify a MME of the type of radio access to the destination when the UE has connected to a network of a cellular communications operator. For example, when the UE intends to establish connections to both the 3GPP radio access network and the non-3GPP radio access network, the UE notifies the MME of its intention. Therefore, this problem is solved by this conventional technique to notify the MME that the UE has a connection on the non-3GPP radio access network. This information can assume that the MME knows the time of notifying the PDN-GW when deciding to offload the UE to another PDN-GW. However, this conventional technique does not give a detailed description on an indication between the MME and the PDN-GW at the time when the UE has been offloaded.

Patent Document 2 teaches a process capable of determining whether a data session is congested on one of multiple interfaces of UE. If so, the UE can forward the data session to another uncongested interface. This process includes a comparison between the maximum processing capacity value for a specific session on a specific interface and a processing capacity value for all sessions on the same interface. As a result of the comparison, when the processing capacity value for the data session is smaller than the sum of the processing capacity values for all the sessions on the same interface, the data session is forwarded to another interface. Thus, this conventional technique causes the UE always to monitor and compare all data sessions on various interfaces of the UE to solve this problem. However, it seems that always monitoring and comparing all the data sessions on various interfaces of the UE increases the requirements to be processed in the UE. Thus, it can be said that this conventional technique solves this problem by the possibility of additional processing in the UE capable of being allocated for any another purpose.

Based on Non-Patent Document 1, since the UE 0100 has a connection to the PDN-GW through the non-3GPP radio access network, the PDN-GW 0104 sends the MME 0102 a notification of a request not to change the database of a home subscription server (HSS). Upon receipt of this notification, the MME 0102 can estimate that the UE 0100 is connected to the PDN-GW 0104 through the non-3GPP radio access network. However, since the MME 0102 controls only the 3GPP radio connection of the UE 0100 so far, the MME 0102 has no means for requesting the UE 0100 to terminate the non-3GPP radio access connection to the PDN-GW 0104. Therefore, the signaling path S0107 to the PDN-GW 0104 remains present.

PRIOR ART DOCUMENTS

Patent Documents

Patent Document 1: K-M Shaheen, "Method and apparatus for performing attachment procedures", US Patent Application Publication Number 2008/0181178 A1, Jul. 31, 2008.
Patent Document 2: K-G Chantepie, S-A Orvault, D-B LaBouexiere, J-M-B Corps Nuds and L-S Cesson Sevigne, "Method for the optimized management of resources in a terminal comprising multiple interfaces", US Patent Application Publication Number 2009/0129274 A1, May 21, 2009.

Non-Patent Documents

Non-Patent Document 1: 3GPP TS 23.261 V0.3.0 (2010-03) (Release 10): "IP Flow Mobility and seamless WLAN offload; stage 2".
Non-Patent Document 2: 3GPP TS 22.101 V10.1.0 (2009-12) (Release 10): "Service principles".
Non-Patent Document 3: 3GPP TS 24.301 V9.1.0 (2009-12) (Release 9): "Non-Access-Stratum (NAS) protocol for Evolved Packet System (EPS); Stage 3".
Non-Patent Document 4: B. Haley, et al., "Mobility Header Home Agent Switch Message", RFC 5142, January 2008.
Non-Patent Document 5: R. Wakikawa, et al., "Multiple Care-of Addresses Registration", RFC 5648, October 2009.
Non-Patent Document 6: 3GPP TS 23.401 V9.3.0 (2009-12) (Release 9): "General Packet Radio Service (GPRS) enhancements for Evolved Universal Terrestrial Radio Access Network (E-UTRAN) access".
Non-Patent Document 7: 3GPP TS 24.302 V9.1.1 (2009-12) (Release 9): "Access to the 3GPP Evolved Packet Core (EPC) via non-3GPP access networks; stage 3".
Non-Patent Document 8: R. Stewart, "Stream Control Transmission Protocol", RFC 4960, September 2007.

SUMMARY OF THE INVENTION

Therefore, it is an object of the present invention to overcome the above-mentioned problems and inadequacies of the conventional techniques or at least improve them in a practical way. To be more specific, it is the primary object of the present invention to ensure that, if there is an additional connection of the UE to a first PDN-GW when UE has been offloaded from the first PDN-GW to a second PDN-GW, the additional connection will be further considered for the offload. It is a further object of the present invention to solve another problem that, when the UE is connected to telecommunications carrier networks at the same time, the network cannot offload the UE successfully because of the presence of plural connections.

In order to attain the above object, according to the present invention, there is provided a path switching system for switching a path used to exchange a packet in a communication session between a mobile terminal and a communication device as a communication partner of the mobile terminal through a network having multiple relay devices in connection with movement of the mobile terminal, the system including: a control unit for performing connection management of the mobile terminal, and when switching between the relay devices for relaying the packet to be exchanged for a first communication session between the mobile terminal and the communication device along with the movement of the mobile terminal, sending the mobile terminal a message including information indicative of having switched from a first relay device as the relay device before the movement of the mobile terminal to a second relay device as the relay device after the movement of the mobile terminal; and the mobile terminal for determining, upon receiving the message, whether there is an added path other than a path as part of a path from the mobile terminal before the movement to the communication device and capable of being managed by the control unit, established between the mobile terminal and the first relay device, where the added path is part of the path from the mobile terminal before the movement to the communication device and incapable of being managed by the control unit, established between the mobile terminal and the first relay device, and when there is the added path, performing predetermined processing on the added path based on information on a second communication session between the mobile terminal and the communication device, where the second communication session is different from the first communication session. Here, the control unit corresponds to MME to be described later, and the path capable of being managed by the control unit and the added path incapable of being managed by the control unit correspond, for example, to a 3GPP path and a non-3GPP path to be described later, respectively. Further, when the predetermined processing is processing for deleting the added path, deletion of the added path means, for example, that a connection is restored to a state before the connection is established.

Further, according to the present invention, there is provided a path switching method for switching a path used to exchange a packet in a communication session between a mobile terminal and a communication device as a communication partner of the mobile terminal through a network having multiple relay devices in connection with movement of the mobile terminal, the method including: a step in which, when switching between the relay devices for relaying the packet to be exchanged for a first communication session between the mobile terminal and the communication device along with the movement of the mobile terminal, a control unit for performing connection management of the mobile terminal sends the mobile terminal a message including information indicative of having switched from a first relay device as the relay device before the movement of the mobile terminal to a second relay device as the relay device after the movement of the mobile terminal; and a step of causing the mobile terminal to determine, upon receiving the message, whether there is an added path other than a path as part of a path from the mobile terminal before the movement to the communication device and capable of being managed by the control unit, established between the mobile terminal and the first relay device, where the added path is part of the path from the mobile terminal before the movement to the communication device and incapable of being managed by the control unit, established between the mobile terminal and the first relay device, and when there is the added path, to perform predetermined processing on the added path based on information on a second communication session between the mobile terminal and the communication device, where the second communication session is different from the first communication session.

Further, according to the present invention, there is provided a mobile terminal used in a path switching system for switching a path used to exchange a packet in a communication session between the mobile terminal and a communication device as a communication partner of the mobile terminal through a network having multiple relay devices in connection with movement of the mobile terminal, the mobile terminal including: receiving unit for receiving a message from a control unit for performing connection management of the mobile terminal or a gateway device to which the mobile terminal is connected, wherein when switching between the relay devices for relaying the packet to be exchanged for a first communication session between the mobile terminal and the communication device along with the movement of the mobile terminal, the message includes information indicative of having switched from a first relay device as the relay device before the movement of the mobile terminal to a second relay device as the relay device after the movement of the mobile terminal; determining unit for determining, upon receiving the message, whether there is an added path other than a path as part of a path from the mobile terminal before the movement to the communication device and capable of being managed by the control unit, established between the mobile terminal and a first relay device, where the added path is part of the path from the mobile terminal before the movement to the communication device and incapable of being managed by the control unit, established between the mobile terminal and the first relay device; and processing unit which, when there is the added path, performs predetermined processing on the added path based on information on a second communication session between the mobile terminal and the communication device, where the second communication session is different from the first communication session.

The path switching system, the path switching method, and the mobile terminal according to the present invention are such that, if there is an additional connection of the UE to a first PDN-GW when the mobile terminal (UE) has been offloaded from the first PDN-GW to a second PDN-GW, processing for the additional connection can be decided and performed on the UE side.

BRIEF DESCRIPTION OF THE DRAWINGS

For better understanding of the present invention to carry out the same, the accompanying drawings will be referred to.

FIG. 8 It is a diagram another network topology of the system according to the preferred embodiment of the present invention and described in the Third Generation Partnership Project (3GPP).

DESCRIPTION OF EMBODIMENTS

For the sake of clarity, specific numbers, times, configurations, protocol names, and other parameters are mentioned in the following description for perfect understanding of the present invention. However, it will be readily apparent to those skilled in the art that the present invention can be carried out without these specific details. In other examples, known components and modules are shown in the form of a block diagram to prevent the present invention from being made unnecessarily hard to understand.

Embodiment of General Method

The present invention provides means for causing a network to notify UE that a 3GPP radio access connection of the UE has been offloaded from a first PDN-GW to a second PDN-GW. Further, when receiving such a notification, the UE starts a decision process to determine the influence of the offload on a connection in progress held by the UE at present. For example, when the UE has a non-3GPP radio access connection to the first PDN-GW, the UE can decide to disconnect, maintain, or hand over the non-3GPP radio access connection. The advantage of having a decision function in the UE for such a purpose is that an opportunity for the UE to try a smooth handover of a session from the first PDN-GW to the second PDN-GW is provided, rather than that the UE negotiates again the continuation of the session with the second PDN-GW in response to a sudden disruption of the session. In the following, communication being performed by the UE is referred to as a session, but the expression is not limited to the session as long as it represents an identifiable communication unit. For example, it may be referred to as a connection (TCP/UDP connection, SCTP connection) or a flow (IP flow) depending on the target layer.

First Embodiment

General Logic of UE Upon Triggering Offload

Figure 1:
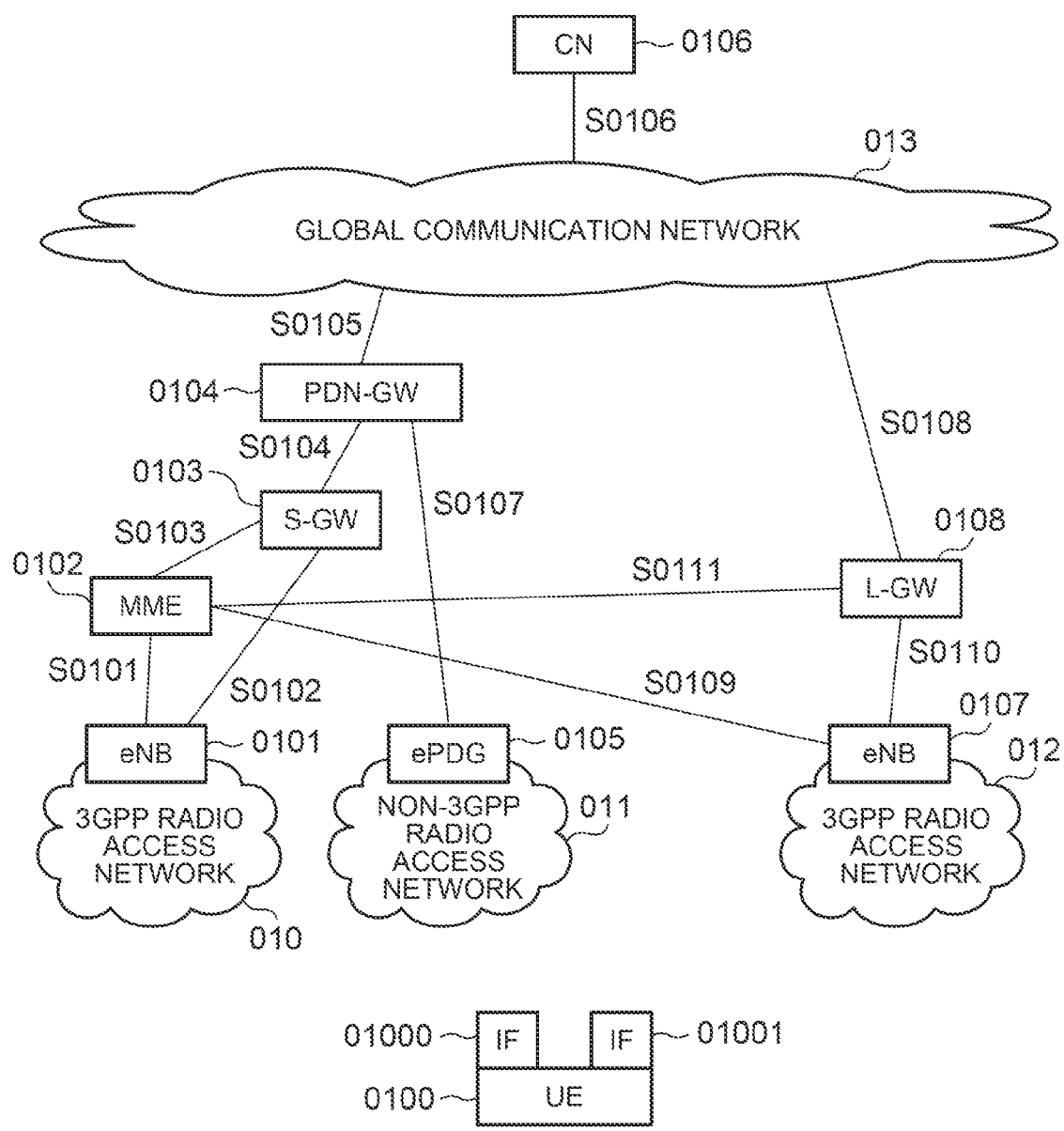
FIG. 1 is a diagram showing a network topology of a system according to a preferred embodiment of the present invention and described in the Third Generation Partnership Project (3GPP).
Figure 2:
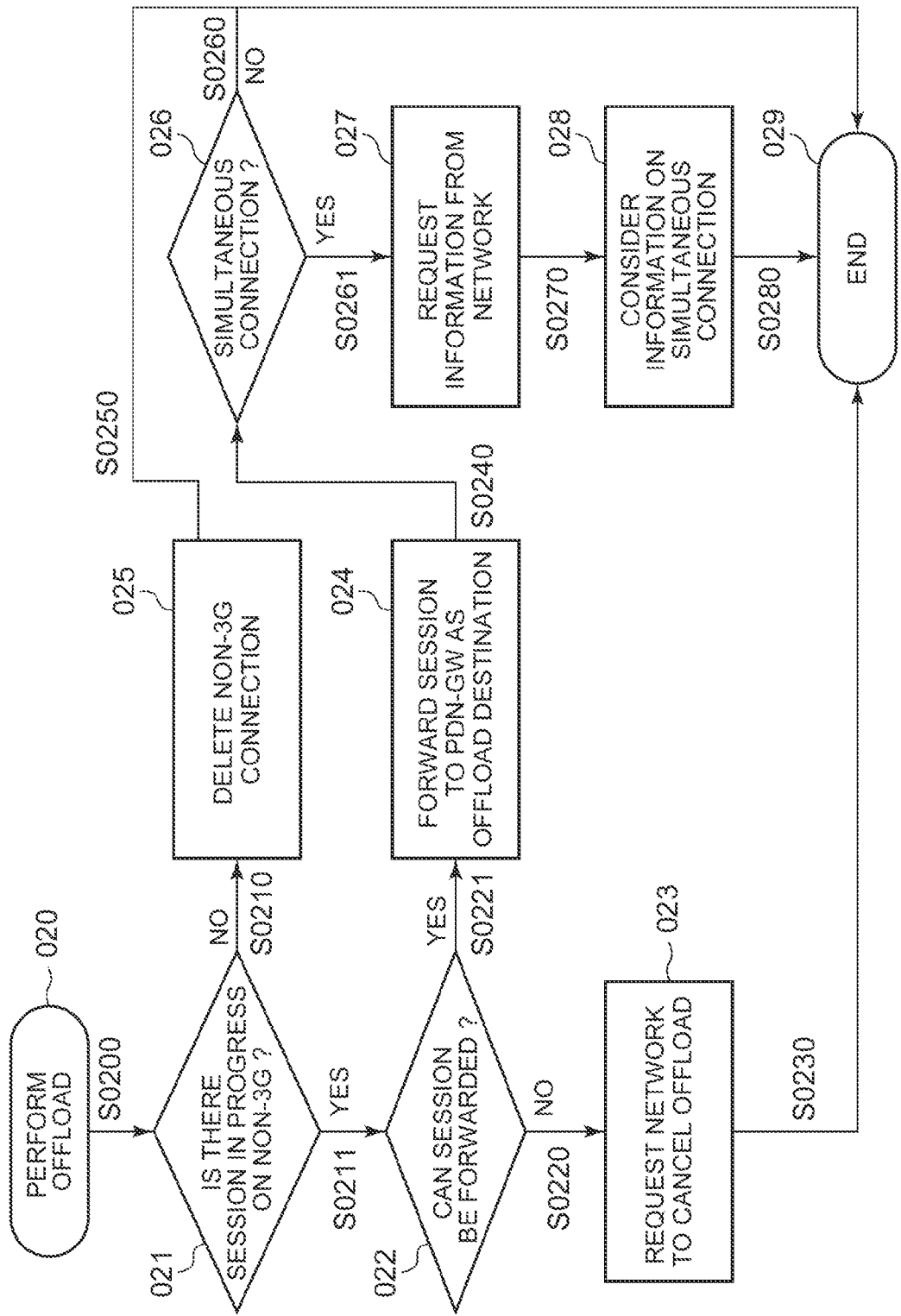
FIG. 2 It is a flowchart related to a type of decision made by user equipment to determine the influence when offload has been performed according to a preferred embodiment of the present invention.

When the UE receives a notification from the network that the UE has been offloaded to another PDN-GW, a decision function in the UE is required to decide on the influence of the offload on the connection in progress held by the UE at present. FIG. 2 is a flowchart related to a type of decision made by the UE to determine the influence when offload has been performed.

In this embodiment, when the UE 0100 receives a notification from the network that an IF 01000 of the UE 0100 has been offloaded from a PDN-GW 0104 to an L-GW 0108, this function is started (020), or when the UE 0100 considers that the network has offloaded the IF 01000 of the UE 0100 from the PDN-GW 0104 to the L-GW 0108, this function is started. The UE 0100 may determine that the offload has been performed when a prefix assigned to the UE 0100 has been changed. This function further proceeds (S0200) to check whether there is a data session (data flow) in progress on the IF 01001 using the connection on the IF 01001 through the PDN-GW 0104 (021). This check may be, but not limited to, a step in which a processor of the UE 0100 identifies to which physical interfaces of the UE 0100 various critical sessions of the UE 0100 in progress are mapped. In the present invention, the term critical session means a data session considered by a user or a cellular communications operator to be important (i.e., a voice call). It is assumed that, when the offload from the PDN-GW 0104 to the L-GW 0108 is performed and the continuation of a session conducted on the IF 01000 of the UE 0100 through the PDN-GW 0104 is to be maintained, processing necessary for the continuation of the session (switching between addresses by SCTP or application level function, or the like) is performed by the UE.

When it is checked that there is no data session with the PDN-GW 0104 on the IF 01001 (S0210), this function moves to processing for deleting the non-3GPP radio access connection between the IF 01001 and the PDN-GW 0104 (025). The deletion may be, but not limited to, a step of sending a BU message without simultaneous home and foreign binding (H) flag and lifetime defined in Non-Patent Document 5 by means of a mobile IP stack in the UE 0100. Though not shown, instead of determining whether to delete the connection depending on the presence or absence of a data session, the UE 0100 may check on the state of a 3G connection through the L-GW 0108 to determine to delete a non-3G connection when an available frequency band, QoS, and the like are determined to be sufficient (inadequate) for a session conducted or possibly conducted by the UE 0100.

When it is checked that there is a data session on the IF 01001 to the PDN-GW 0104 (S0211), this function moves to processing for determining whether the data session can be forwarded to the L-GW 0108 (022). This determination may be, but not limited to, a step of determining whether the data session is supported by a stream control transmission protocol (SCTP), and if so, deciding by means of the processor in the UE 0100 that the data session can be forwarded by the SCTP means. In another decision means, it may be determined whether the data session can be forwarded by application level support (for example, by instant messaging), and if so, deciding by means of the processor in the UE 0100 that the data session can be forwarded by the instant messaging means.

Further, upon determining whether the session can be forwarded or not (022), the UE 0100 may refer to an operator policy for communication (also called a flow policy or a routing rule). For example, when the policy describes that a session on a WLAN wireless interface can be forwarded by using a 3G interface, it may be determined that the session can be forwarded. In this case, it may be determined that a session described in the policy to be a session whose communication can be continued even if the IP address is changed due to the offload to the L-GW 0108 can be forwarded. Further, if it is described that a session can be forwarded by using the WLAN interface alone, it may be determined that the session cannot be forwarded. In this case, it may be determined that a session described in the policy to be a session whose communication cannot be continued when the IP address is changed due to the offload to the L-GW 0108 cannot be forwarded. The policy may be information held by the UE 0100 beforehand, or information dynamically acquired from an ANDSF (Access Network Discovery and Selection Function) server located within the core network. When forwarding of all sessions is so completed that there will be no session on the non-3GPP connection, processing after S0210 is performed.

When it is determined that the data session cannot be forwarded to the L-GW 0108 (S0220), this function requests the network not to offload the IF 01000 of the UE 0100 to the L-GW 0108 (023). This request may be, but not limited to, a step of causing the UE 0100 to send the network a message including an indication that the UE 0100 does not wish the offload to the L-GW 0108. When the request is sent by the UE 0100 (S0230), this function is ended (029). Based on whether the network accepts or denies the request from the UE 0100 not to offload the IF 0100, an action to be taken by the UE 0100 next will be described in embodiments (fifth and sixth embodiments) later.

Though not shown, even if there is a session determined in S0220 not to be able to be forwarded to the L-GW 0108 among the sessions on the non-3GPP connection, the UE 0100 may maintain the non-3GPP connection to the PDN- GW 0104 without requesting the network to cancel the offload to continue the communication. In other words, the session determined not to be able to be forwarded to the L-GW 0108 is continued by using the non-3GPP connection through the PDN-GW 0104 even after the 3GPP connection is offloaded to the L-GW 0108. The session that cannot be forwarded to the L-GW 0108 is a session whose communication cannot be maintained when the IP address is changed by the offload to the L-GW 0108, a flow for which a policy governing use of only the non-3GPP connection is described, or the like. Even when there is a session determined in S0220 not to be able to be forwarded to the L-GW 0108 among the sessions on the 3GPP connection, if the session is a session that can be forwarded to a non-3GPP connection, i.e., if the session can be determined to be a session for which the non-3GPP connection can be used as well as the 3GPP connection, the session will be forwarded to the non-3GPP connection to continue the communication using the non-3GPP connection. Thus, even when a session that cannot be forwarded to the L-GW 0108 is present on the 3GPP connection, since the session can be continued by using the non-3GPP connection, there is no need to cancel offload for the 3GPP connection. A policy describing whether a session on the 3GPP connection can be forwarded to the non-3GPP connection may be referred to.

When it is determined that the data session can be forwarded to the L-GW 0108 (S0221), this function forwards the session to the L-GW 0108 (024). Forwarding may be, but not limited to, a step of causing an SCTP protocol in the UE 0100 to negotiate with a CN 0106 about the start of forwarding of the session to an IP address assigned by the L-GW 0108. For example, it may be a step of registering, with the L-GW 0108, the address used for the non-3GPP connection before receiving a notification that the session has been offloaded to the L-GW 0108 as a forwarding destination address of packets destined for the UE 0100. It is desired that a message used for the registration be a binding update message including the IP address assigned by the L-GW 0108 as a home address and the address used for the non-3GPP connection as a care-of address. When the data session is forwarded (S0240), this function determines whether a request for simultaneous connection to the L-GW 0108 is made by the UE 0100 (026). This determination may be made by referring to an operator policy to check whether a flow for the offloaded session is a flow transmissible by using both the 3GPP connection and the non-3GPP connection, or whether the flow is a flow required to use both the 3GPP connection and the non-3GPP connection. The determination may also be made by checking, before the offload is performed, whether the UE had the connections established on both the IF 01000 (3GPP wireless interface) and the IF 01001 (non-3GPP wireless interface) for simultaneous connection to the PDN-GW 0104. In other words, when the UE had the connections for simultaneous connection, it means that a session using both the 3GPP connection and the non-3GPP connection existed. The connections for simultaneous connection indicate the PDN connection on the 3GPP connection and the PDN connection on the non-3GPP connection, to both of which the same HoA is assigned. Further, this may be, but not limited to, an inquiry to the user or to a user preconfigured policy locally stored in the UE 0100 through a graphic user interface (GUI).

When it is determined that the UE 0100 has no simultaneous connection to the L-GW 0108 (S0260), this function is ended (029). When it is determined that the UE 0100 has simultaneous connections to the L-GW 0108 (S0261), this function inquires of the network for additional information on a method of achieving the simultaneous connection (027). The inquiry may be, but not limited to, a step of causing an Open Mobile Alliance Device Management (OMA-DM) stack in the UE 0100 to send an inquiry to an Access Network Discovery and Selection Function (ANDSF) in the network. When the network provides necessary information to the UE 0100 (S0270), the UE 0100 tries to use the information (e.g., the IP address of the L-GW 0108 and a policy) provided by the network to establish a simultaneous connection to the L-GW 0108 (028). The use of the information may be, but not limited to, a step of causing the UE 0100 to register position information (register the home address of packets destined for the UE 0100 as a forwarding destination address) necessary for simultaneous connection to the L-GW 0108, or a step of applying a flow policy provided by the network. When the home address is registered, it is desired to use a binding update message including the IP address assigned by the L-GW 0108 as a care-of address. When the information is applied by the UE 0100 (S0280), this function is ended (029).

Second Embodiment

Procedure for UE to Terminate Connection with n3G

Figure 3:
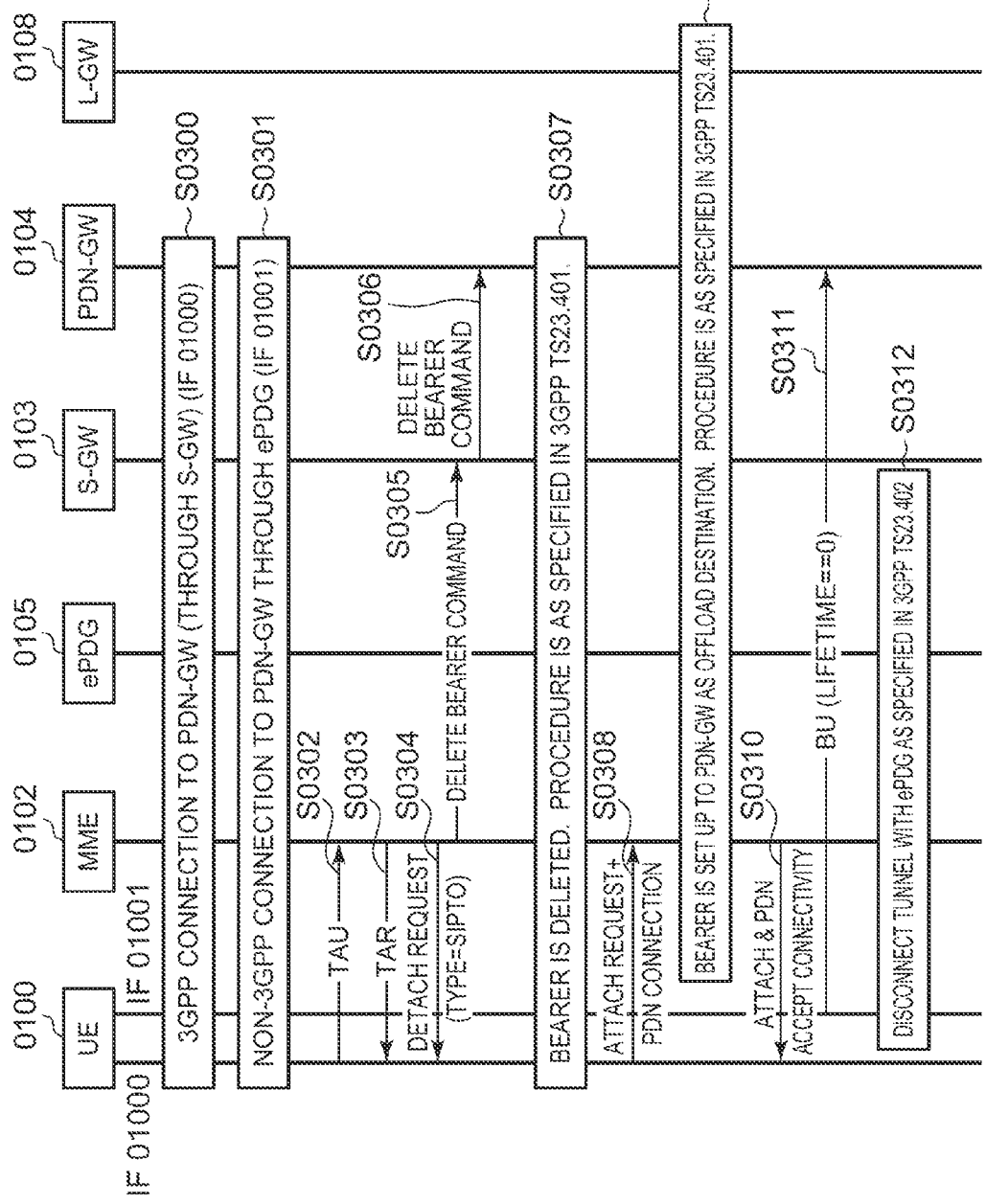
FIG. 3 It is a diagram showing an added path for describing one result of decision made by the user equipment according to the preferred embodiment of the present invention.

As shown in FIG. 2, there are several decisions made by the UE when the UE has been offloaded from the first PDN-GW to the second PDN-GW. FIG. 3 shows a message sequence for describing one result of decision made by the UE.

In this embodiment, it is assumed that both interfaces (IF 01000 and IF 01001) of the UE 0100 do not exchange any data packet at all. It is also assumed that both interfaces of the UE 0100 are connected to the PDN-GW 0104. The IF 01000 is connected to the PDN-GW 0104 through the S-GW 0103 (S0300). The IF 01001 is connected to the PDN-GW 0104 through the ePDG 0105 (S0301). Further, it is assumed that the UE 0100 has moved to an area outside of a tracking area specified by the network. In a 3GPP system, the network defines an area called a tracking area. When the UE is located within a specific tracking area, there is no need to update the network about the location of the UE. When the UE moves away from the specified tracking area, the network has to be updated about a new location of the UE. Using the updated location, the network can specify a new tracking area for the UE.

The UE 0100 detects that it has moved into a cell that is not specified in the tracking area defined by the network, and sends a Tracking Area Update (TAU) message to the MME 0102 (S0302). In this embodiment, it is assumed that the IF 0100 has moved into a communication area of the eNB 0107. This TAU message includes a cell identifier of the destination cell to inform the MME 0102 that the UE 0100 has moved into the cell outside of the tracking area specified by the network. After verifying the TAU message from the UE 0100, the MME 0102 accepts the TAU message from the UE 0100 and responds with a Tracking Area Accept (TAR) message (S0303). This TAR message includes a new tracking area defined by the network for the UE 0100. Through the TAU message received from the UE, since the MME 0102 detects that the UE has moved to the new location, the MME 0102 can trigger the offload of the UE 0100 to another PDN-GW.

This detection may be, but not limited to, a step of causing the MME 0102 to check mapping to see which PDN-GW is in charge of a 3GPP cell as the location to which the UE has moved. The MME 0102 sends a detach request message including SIPTO type to inform the UE 0100 that the reason for detaching is because of the SIPTO (S0304). In this embodiment, it is assumed that the UE 0100 has only one PDN connection on the IF 01000 and the MME 0102 sends the detach request message. This logic that the MME 0102 sends the detach request message to the last PDN connection of 3GPP radio access is described in Non-Patent Document 3.

When the MME 0102 detaches the UE 0100, the MME 0102 deletes the bearer of the UE 0100 held by the S-GW 0103 and the PDN-GW 0104. The MME 0102 sends a delete bearer command message to the S-GW 0102 to inform the S-GW 0103 that the bearer of the UE 0100 is to be deleted (S0305). The delete bearer command message includes a bearer identifier for informing the S-GW 0103 which bearer is to be deleted. Similarly, the S-GW 0103 sends a delete bearer command message to the PDN-GW 0104 to inform the PDN-GW 0104 that the bearer of the UE 0100 is to be deleted (S0306). The PDN-GW 0104 deletes the bearer of the UE 0100 according to a procedure described in Non-Patent Document 6 (S0307).

Since there is SIPTO type in the detach request message, the UE 0100 can understand that the MME 0102 is trying to offload the UE 0100 to another PDN-GW. In this embodiment, it is assumed that when receiving the detach request message including the SIPTO type, the UE 0100 tries to reattach (reconnect) to the network. The UE 0100 sends the MME 0102 an attach request message together with a PDN connectivity request message (S0308). The MME 0102 sets up a bearer between the L-GW 0108 and the UE 0100 according to the procedure described in Non-Patent Document 6 (S0309). When the bearer of the UE 0100 in the network is set up successfully, the MME 0102 sends an attach accept message and a PDN connectivity accept message to inform the UE 0100 that the bearer is prepared (S0310).

In this embodiment, since it is assumed that the UE 0100 has no session on the IF 01000 and the IF 01001, the UE 0100 deletes the connection between the IF 01001 and the PDN-GW 0104 according to the logic defined in FIG. 2 (025 in FIG. 2). The UE 0100 sends the PDN-GW 0104 a BU message with the lifetime set to zero to inform the PDN-GW 0104 of the termination of the connection between the IF 01001 and the PDN-GW 0104 (S0311). The PDN-GW 0104 that received this BU message deletes the connection to the IF 01001. This deletion may be, but not limited to, a step of causing the PDN-GW 0104 to delete an affected entry in its binding cache. When the connection between the IF 01001 and the PDN-GW 0104 is deleted, the UE 0100 deletes the connection with the ePDG 0105 according to a tunnel disconnect procedure described in Non-Patent Document 7 (S0312).

The UE 0100 may check the state of the 3G connection through the L-GW 0108 to determine the deletion of the non-3G connection when the available band, QoS, and the like are determined to be sufficient for sessions done by or possibly done by the UE 0100. Checking the state of the 3G connection is done by comparing the band, the use of which on the 3G connection the UE 0100 is permitted, with a band required for the sessions actually done by or possibly done by the UE 0100. For example, when the permitted band is greater, the non-3G connection is deleted, while when the band required for actual communication is greater, the non-3G connection is maintained. Information on the sessions done by the UE 0100 may be described in a policy held by the UE 0100. Thus, it is determined whether the non-3G connection is necessary or not based on the situation after the offload is performed, and this can prevent any unnecessary non-3GPP connection from being reserved.

For the sake of clarity, this embodiment will be described in the following example: The UE 0100 does not have both a cellular wireless connection and a WLAN wireless connection to the network (the PDN-GW 0104) of the telecommunications carrier at present. The user of the UE 0100 enters a shopping complex and the UE 0100 detects that the cell covering the shopping complex is outside of the tracking area. The UE 0100 updates the network to change the location, and the network recognizes that the L-GW 0108 is near the current location of the UE 0100. The network requests the UE 0100 to detach from and reattach to the network to offload the wireless cellular interface of the UE 0100 to the L-GW 0108.

When the wireless cellular interface is connected to the L-GW 0108 successfully, the UE 0100 decides on how to treat the connection of the WLAN wireless interface. One method is a method of causing the UE 0100 to inform the user through the GUI that the wireless cellular interface has been offloaded and ask the user about whether to perform the same processing on the connection of the WLAN wireless interface. Here, it is assumed that the user wants to terminate the connection of the WLAN wireless interface and instructs the UE 0100 to do it. Alternatively, the UE 0100 can be configured to be governed by a static policy describing that the UE 0100 shall disconnect the WLAN wireless interface when the UE 0100 detects offload. As mentioned above, since there is no session on the non-3G interface, the WLAN wireless interface is disconnected after it is determined that there is no need to forward any session. The UE 0100 disconnects the connection of the WLAN wireless interface with the PDN-GW 0104.

Though not shown in FIG. 2, even when there is no data session on the WLAN wireless interface, if there is a possibility of communication using a non-3G connection through the PDN-GW 0104, it may be determined to maintain the connection without termination. Further, as a result of checking the state of the 3G connection through the L-GW 0108, if the available band, QoS, and the like are determined to be insufficient for the UE 0100, the non-3G connection may be determined to be maintained. The information indicative of whether there is a possibility of communication using a non-3G connection through the PDN-GW 0104 may also be described in the operator policy.

Third Embodiment

Procedure for UE to Forward Session Successfully Through SCTP

Figure 4:
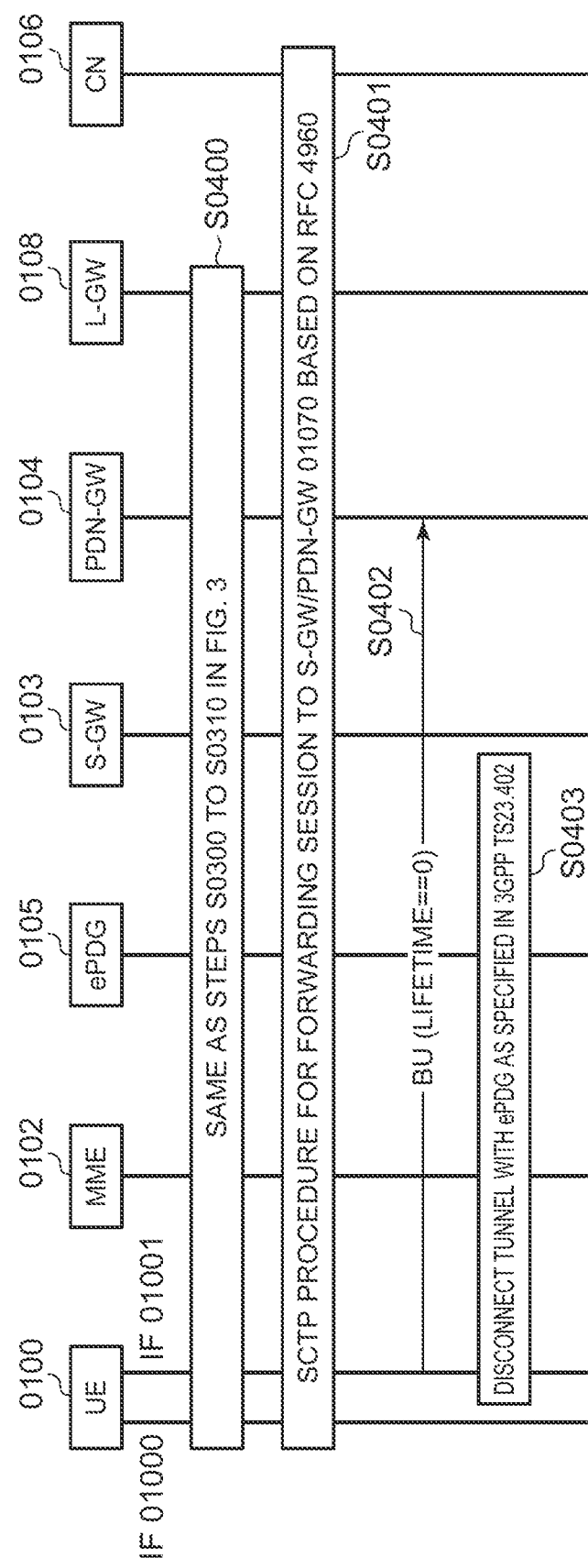
FIG. 4 It is a diagram showing an added path for describing another result of decision made by the user equipment according to the preferred embodiment of the present invention.

As shown in FIG. 2, there are several decisions made by the UE when the UE has been offloaded from the first PDN-GW to the second PDN-GW. FIG. 4 shows a message sequence for describing another result of decision made by the UE.

In this embodiment, it is assumed that both interfaces (IF 01000 and IF 01001) of the UE 0100 are connected to the PDN-GW 0104. The IF 01000 is connected to the PDN-GW 0104 through the S-GW 0103 (S0300). The IF 01001 is connected to the PDN-GW 0104 through the ePDG 0105 (S0301). It is also assumed that the UE 0100 has only one active data session on the IF 01001 at present. The UE 0100 does not exchange any data packet on the IF 01000. Further, it is assumed that the UE 0100 has moved to an area outside of a tracking area specified by the network. In a 3GPP system, the network specifies a specific tracking area for the UE. When the UE is located within the specified tracking area, the UE is informed that there is no need to update the network about the location of the UE. When the UE moves away from the specified tracking area, the network has to be updated about a new location of the UE. Using the updated location, the network can specify a new tracking area for the UE.

In this embodiment, since the steps of updating the network on the location of the UE and offloading the IF 01000 from the PDN-GW 0104 to the L-GW 0108 are the same as the steps (S0300 to S0310) described in FIG. 3, redundant description will be omitted (S0400). In this embodiment, since it is assumed that the UE 0100 has a data session on the IF 01001, the UE 0100 forwards the data session to the L-GW 0108 by using SCTP according to a procedure described in Non-Patent Document 8 in accordance with the logic specified in FIG. 2 (S0401). When addresses can be switched by an application level function, the use of SCTP is not indispensable. In this embodiment, it is assumed that session has been forwarded successfully to a path through the L-GW 0108. When the data session is forwarded, the UE 0100 sends the PDN-GW 0104 a BU message with the lifetime set to zero to notify the PDN-GW 0104 that the connection between the IF 01001 and the PDN-GW 0104 will be terminated (S0402). The PDN-GW 0104 deletes the connection to the IF 01001. This deletion may be, but not limited to, a step of causing the PDN-GW 0104 to delete a related entry in the binding cache. When the connection between the IF 01001 and the PDN-GW 0104 is deleted, the UE 0100 deletes the connection with the ePDG 0105 according to the tunnel disconnect procedure described in Non-Patent Document 7 (S0403).

After completion of forwarding the session, the UE 0100 may check the state of the 3G connection through the L-GW 0108 to determine the deletion of the non-3G connection when the available band, QoS, and the like are determined to be sufficient for the session forwarded by the UE 0100 or sessions possibly done from here on. Checking the state of the 3G connection is done by comparing the band, the use of which on the 3G connection the UE 0100 is permitted, with a band required for the sessions actually done by or possibly done by the UE 0100. For example, when the permitted band is greater, the non-3G connection is deleted, while when the band required for actual communication is greater, the non-3G connection is maintained. Information on the sessions done by the UE 0100 may be described in the policy held by the UE 0100. Thus, it is determined whether the non-3G connection is necessary or not based on the situation after the offload is performed, and this can prevent any unnecessary non-3GPP connection from being reserved.

For the sake of clarity, this embodiment will be described in the following example: The UE 0100 has both a cellular wireless connection and a WLAN wireless connection to the network (PDN-GW 0104) of the telecommunications carrier at present, having an Internet data session on the WLAN wireless interface. The user of the UE 0100 enters a shopping complex and the UE 0100 detects that the cell in charge of the shopping complex is outside of the tracking area. The UE 0100 updates the network to change the location, and the network recognizes that the L-GW 0108 is near the current location of the UE 0100. The network requests the UE 0100 to detach from and reattach to the network to offload the wireless cellular interface of the UE 0100 to another PDN-GW (L-GW 0108).

When the wireless cellular interface is connected to the L-GW 0108 successfully, the UE 0100 decides on how to treat the data session on the WLAN wireless interface. One method is a method of causing the UE 0100 to inform the user through the GUI that the wireless cellular interface has been offloaded and ask the user about whether the user wants to forward the data session on the WLAN wireless interface to the offloaded L-GW 0108. Here, it is assumed that the user wants forwarding, and instructs the UE 0100 to do it. Alternatively, the UE 0100 can be configured to be governed by a static policy describing that the UE 0100 shall forward the data session when the UE 0100 detects offload. The UE 0100 forwards the data session to the L-GW 0108. Upon successful forwarding, the UE 0100 terminates the connections of the WLAN wireless interface with the PDN-GW 0104 and the ePDG 0105.

Even when there is any data session on the WLAN wireless interface, the data session will not be forwarded if the user does not desire the forwarding or if the forwarding is not described in the policy.

Fourth Embodiment

Alternative Embodiment of Flow Forwarding Using Mobile IP

Figure 5:
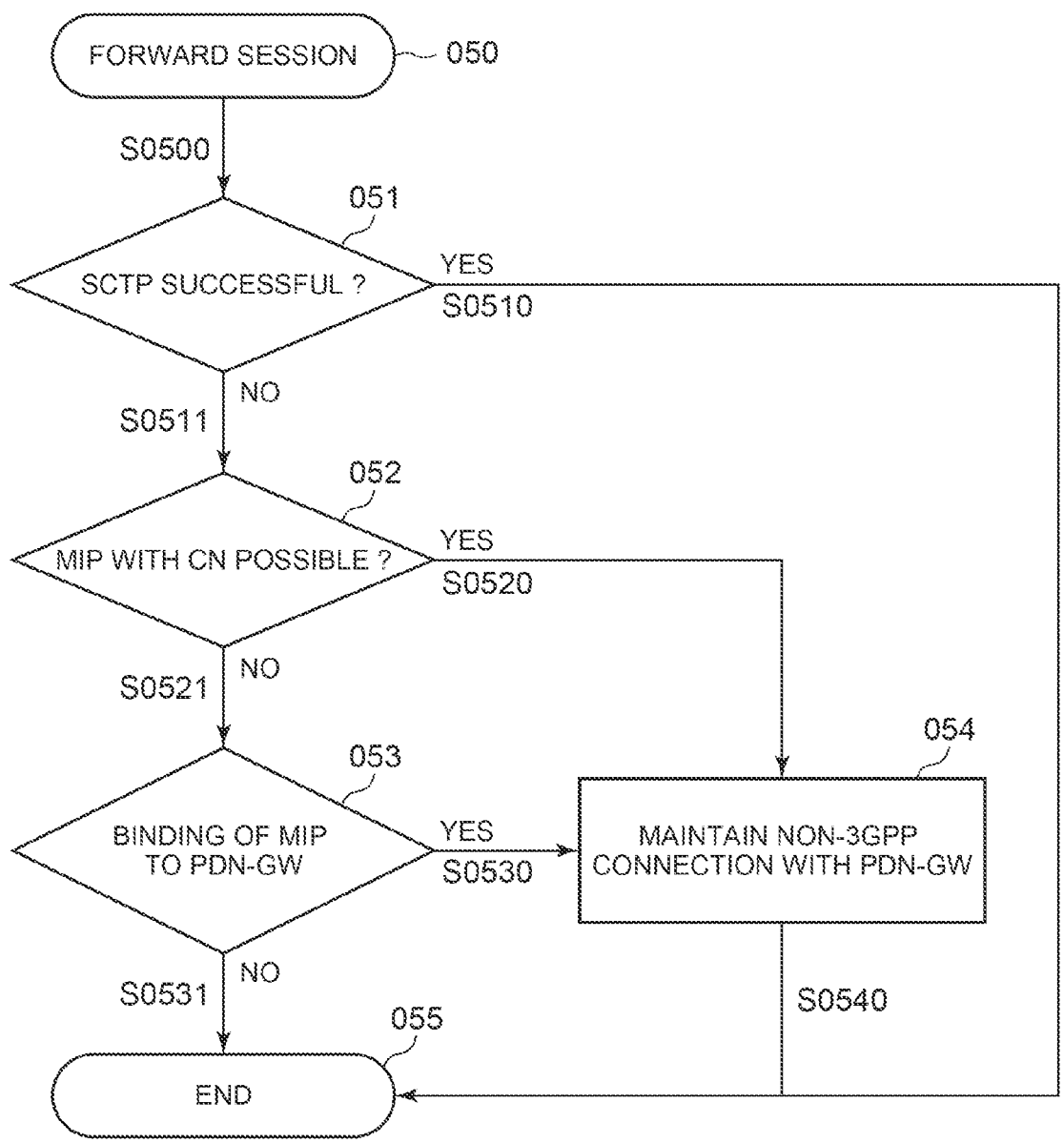
FIG. 5 It is a flowchart of decision made by the user equipment to decide on a method of forwarding a data session to an offloaded packet data network gateway according to the preferred embodiment of the present invention.

In the above embodiment (third embodiment), the description is made of the method of using SCTP as a method of causing the UE to forward a data session to an offloaded PDN-GW. FIG. 5 is a decision flowchart performed by the UE to determine a method of forwarding the offloaded data session to the PDN-GW.

This function starts when the UE 0100 decides to forward the data session to the offload PDN-GW (050). This function further proceeds (S0500) to check whether the data session can be forwarded successfully by using SCTP (051). As a result of checking, when it is determined that the data session can be forwarded successfully by using SCTP (S0510), this function is ended (055). As a result of checking, when it is determined that the data session cannot be forwarded successfully by using SCTP (S0511), this function determines whether the data session can be forwarded by using mobile IP signaling with the CN 0106 (052). This determination may be, but not limited to, a step of causing a mobile IP stack in the UE 0100 to send the CN 0106 a BU message including HoA assigned by the PDN-GW 0104 and an IP address (IP.0108.Addr) assigned by the L-GW 0108 as care-of addresses. This binding is registered so that the CN 0106 will sends the data session to IP.0108.Addr instead of the HoA.

When the determination indicates that the UE 0100 can perform the mobile IP address binding (S0520), this function decides to maintain the non-3GPP access connection between the IF 01001 and the PDN-GW 0104 (054). The purpose of maintaining the connection is to maintain the HoA assigned by the PDN-GW 0104 to make the mobile IP binding active at the CN 0106. When the connection is maintained (S0540), this function is ended (055). On the other hand, when the determination indicates that the UE 0100 cannot perform the mobile IP address binding to the CN 0106 (S0521), this function attempts to perform a mobile IP address binding to the PDN-GW 0104 (053). This attempt may be, but not limited to, a step of causing the mobile IP stack in the UE 0100 to send the PDN-GW 0104 the BU message including the HoA assigned by the PDN-GW 0104 and the IP address (IP.0108.Addr) assigned by the L-GW 0108 as the care-of addresses. This binding enables the PDN-GW 0104 to continue to send the UE 0100 data packets addressed to the HoA through the L-GW 0108.

In FIG. 5, checking (051) as to whether the session can be forwarded by using SCTP is not indispensable, and the procedure may start with checking (052 or 053) as to whether the session can be forwarded by using the mobile IP. Further, in FIG. 5, checking (052) as to whether the mobile IP address binding to the CN 0106 can be registered is not indispensable, and the procedure may start with checking (053) as to whether address binding to the PDN-GW 0104 can be registered.

When this attempt enables the UE 0100 to perform the mobile IP address binding (S0530), this function decides to maintain the non-3GPP access connection between the IF 01001 and the PDN-GW 0104 (054). The purpose of maintaining the connection is to save the HoA assigned by the PDN-GW 0104 in order to make the mobile IP binding active at the PDN-GW 0104. When the connection is maintained (S0540), this function is ended (055). When this attempt does not enable the UE 0100 to perform the mobile IP address binding (S0531), this function is ended (055).

For the sake of clarity, this embodiment will be described in the following example: The UE 0100 has both a cellular wireless connection and a WLAN wireless connection to the network (the PDN-GW 0104) of the telecommunications carrier at present, having an Internet data session on the WLAN wireless interface. The user of the UE 0100 enters a shopping complex and the UE 0100 detects that the cell in charge of the shopping complex is outside of the tracking area. The UE 0100 updates the network to change the location, and the network recognizes that the L-GW 0108 is near the current location of the UE 0100. The network requests the UE 0100 to detach from and reattach to the network to offload the wireless cellular interface of the UE 0100 to a PDN-GW. When the wireless cellular interface is connected to the PDN-GW successfully, the UE 0100 decides on how to treat the data session on the WLAN wireless interface. One of the methods is a method of causing the UE 0100 to inform the user through the GUI that the wireless cellular interface has been offloaded and ask the user about whether the user wants to forward the data session on the WLAN wireless interface to the offloaded PDN-GW (L-GW 0108). Here, it is assumed that the user wants the forwarding, and instructs the UE 0100 to do it.

Alternatively, the UE 0100 can be configured to be governed by a static policy describing that the UE 0100 will try to forward the data session when the UE 0100 detects offload. The UE 0100 forwards the data session to the L-GW 0108 by SCTP or the mobile IP. Upon successful forwarding, if the data session is forwarded by SCTP, the UE 0100 will terminate the connections of the WLAN wireless interface to the PDN-GW 0104 and the ePDG 0105. If the data session is forwarded by the mobile IP, the UE 0100 will continue to maintain the connections of the WLAN wireless interface to the PDN-GW 0104 and the ePDG 0105. In the case of the mobile IP, the purpose of maintaining the connection with the PDN-GW 0104 is to save the HoA assigned by the PDN-GW 0104. When this is not done, the network considers that the HoA is no longer used, and assign the HoA to another node. Since the UE 0100 needs to use the signaling path S0107 continuously for data communication with the CN 0106, it uses signaling paths (S0100 and S0108) instead to use the offload triggered by the network.

Fifth Embodiment

When Network Accepts Cancellation of SIPTO

Figure 6:
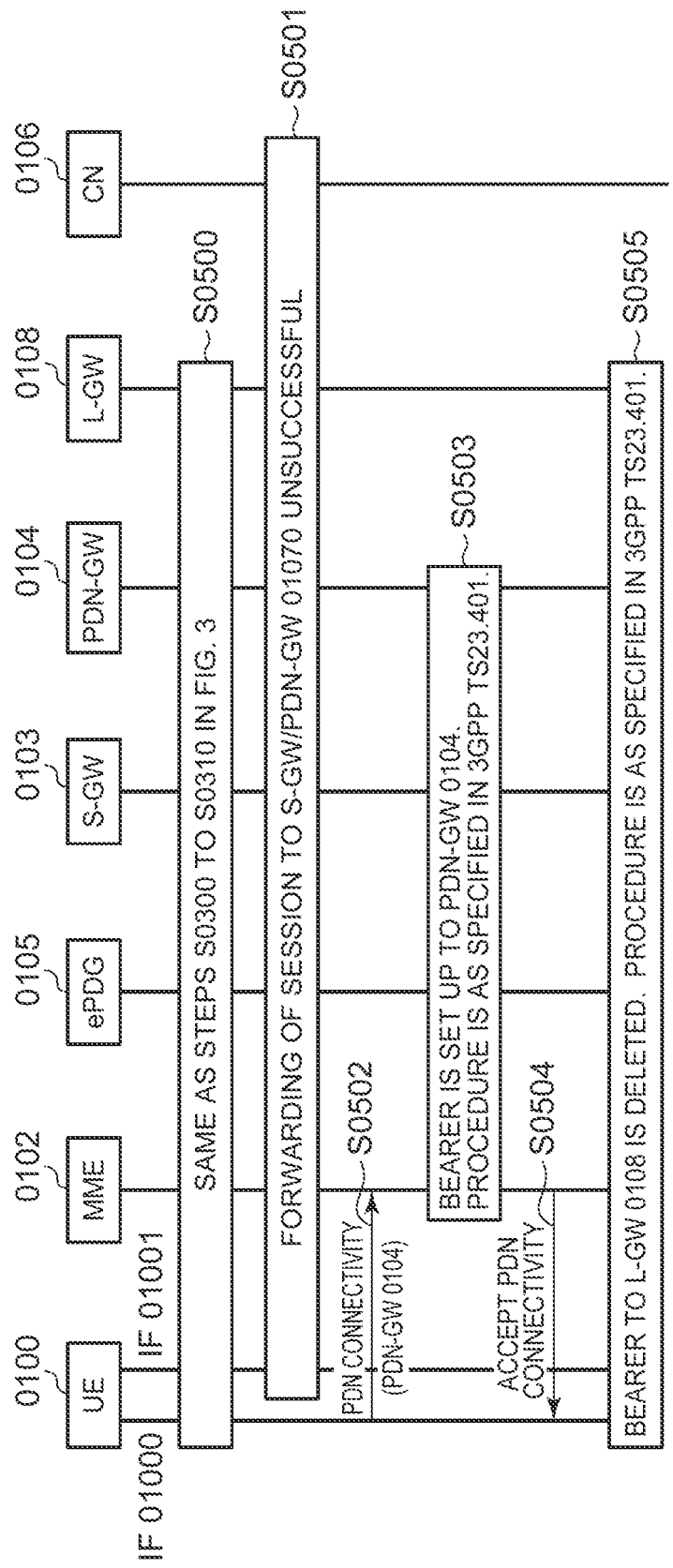
FIG. 6 It is a diagram showing an added path for describing still another result of decision made by the user equipment according to the preferred embodiment of the present invention.

As shown in FIG. 2, there are several decisions made by the UE when the UE has been offloaded from the first PDN-GW to the second PDN-GW. FIG. 6 shows a message sequence for describing still another decision result made by the UE.

In this embodiment, it is assumed that both interfaces (IF 01000 and IF 01001) of the UE 0100 are connected to the PDN-GW 0104. The IF 01000 is connected to the PDN-GW 0104 through the S-GW 0103 (S0300). The IF 01001 is connected to the PDN-GW 0104 through the ePDG 0105 (S0301). It is also assumed that the UE 0100 has only one active data session on the IF 01001 at present. The UE 0100 does not exchange any data packet on the IF 01000. Further, it is assumed that the UE 0100 has moved to an area outside of a tracking area specified by the network. In a 3GPP system, the network specifies a specific tracking area for the UE. When the UE is located within the specified tracking area, the UE is informed that there is no need to update the network about the location of the UE. When the UE moves away from the specified tracking area, the network has to be updated about a new location of the UE. Using the updated location, the network can specify a new tracking area for the UE.

In this embodiment, since the steps of updating the network on the location of the UE and offloading the IF 01000 from the PDN-GW 0104 to the L-GW 0108 is the same as the steps (S0300 to S0310) described in FIG. 3, redundant description will be omitted (S0500). In this embodiment, since it is assumed that the UE 0100 has a data session on the IF 01001, the UE 0100 tries to forward the data session to the L-GW 0108 in accordance with logic specified in FIG. 5 (S0501). In this embodiment, it is assumed that the data session is not forwarded successfully. Further, the user does not desire offload to the L-GW 0108 not to interrupt the session with the CN 0106. Therefore, the UE 0100 sends the MME 0102 a PDN connectivity request message to require the connectivity to be returned to the PDN-GW 0104 (S0502). In this PDN connectivity request message, there is an indication to the MME 0102 that the UE 0100 wants to return the connection to the PDN-GW 0104 (for example, identification of the PDN-GW 0104).

In this embodiment, it is assumed that the MME 0102 accepts a forwarding request from the UE 0100 to the PDN-GW 0104. The MME 0102 sets up a bearer between the L-GW 0108 and the UE 0100 according to the procedure described in Non-Patent Document 6 (S0503). When the bearer for the UE 0100 in the network is set up successfully, the MME 0102 sends a PDN connectivity accept message to notify the UE 0100 that a bearer for the UE 0100 is prepared (S0504). When accepting reconnection of the UE 0100 to the PDN-GW 0104, the MME 0102 also delete the bearer of the UE 0100 to the L-GW 0108. The bearer is deleted according to the procedure described in Non-Patent Document 6 (S0505).

For the sake of clarity, this embodiment will be described in the following example: The UE 0100 has both a cellular wireless connection and a WLAN wireless connection to the network (the PDN-GW 0104) of the telecommunications carrier at present, having an Internet data session on the WLAN wireless interface. The user of the UE 0100 enters a shopping complex and the UE 0100 detects that the cell in charge of the shopping complex is outside of the tracking area. The UE 0100 updates the network to change the location, and the network recognizes that the L-GW 0108 is near the current location of the UE 0100. The network requests the UE 0100 to detach from and reattach to the network to offload the wireless cellular interface of the UE 0100 to a PDN-GW. Concurrently, the PDN-GW 0104 continues to forward packets from the Internet data session to the UE 0100 through the WLAN wireless interface (IF 01001).

When the wireless cellular interface is connected to the PDN-GW successfully, the UE 0100 decides on how to treat the data session on the WLAN wireless interface before terminating the connection between the IF 01001 and the PDN-GW 0104. The advantage of terminating the connection only after determining whether the data session can be forwarded is that the UE can maintain the previous IP address (i.e., HoA) for communication to eliminate the need to change the communication address for the data session in progress. One of the methods is a method of causing the UE 0100 to inform the user through the GUI that the wireless cellular interface has been offloaded and ask the user about whether the user wants to forward the data session on the WLAN wireless interface to the offloaded PDN-GW (L-GW 0108). Here, it is assumed that the user wants the forwarding, and instructs the UE 0100 to do it. Alternatively, the UE 0100 can be configured to be governed by a static policy describing that the UE 0100 shall forward the data session when the UE 0100 detects offload. In this case, the UE 0100 forwards the data session to the L-GW 0108.

However, the UE 0100 will not succeed in forwarding the data session to the L-GW 0108. The UE 0100 needs to know whether the user thinks that there is no harm in interrupting the current data session. One method is a method of informing the user through the GUI that the UE 0100 failed in forwarding the data session and asking the user about whether the session can be interrupted. Here, it is assumed that the user does not want to interrupt the session, and instructs the UE 0100 about it. Alternatively, the UE 0100 can be configured to be governed by a static policy describing that certain kinds of data sessions cannot be interrupted. In this case, the UE 0100 requests the network to return the connection to the PDN-GW 0104. It is assumed that the network accepts this request so that the UE 0100 can continue to use the connection between the IF 01000 and the PDN-GW 0104.

Sixth Embodiment

When Network Does not Accept Cancellation of SIPTO

In the previous embodiment (fifth embodiment), it is assumed that the network returns the connection of the UE 0100 to the PDN-GW 0104. In this embodiment, it is assumed that the network does not return the connection of the UE 0100 to the PDN-GW 0104. Therefore, when receiving the PDN connectivity request message from the UE 0100 (S0502), the MME 0102 rejects the PDN connectivity request. Such a reject may be a clear indication that the network gives preference to SIPTO over all other functions. Thus, when the UE continues to roam around inside the network and receives another SIPTO command, since the UE 0100 recognizes that the network will not provide session mobility upon triggering SIPTO, the UE 0100 can select that the data session forwarding process is not executed.

Seventh Embodiment

Deletion of n3G (non-3G) Connection to PDN-GW 0104 by Network

Figure 7:
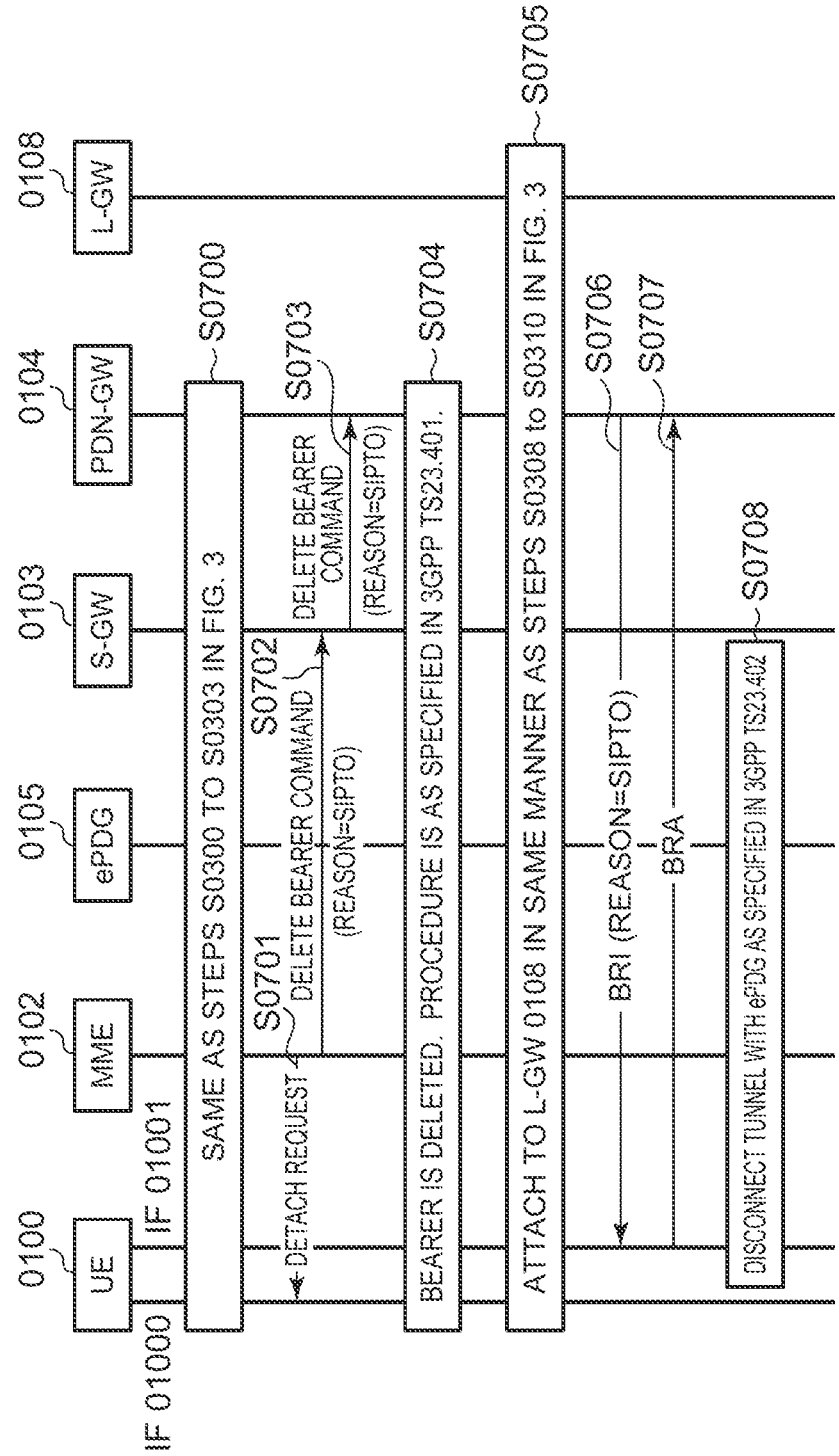
FIG. 7 It is a chart showing a message sequence describing a packet data network disconnection procedure triggered by a network when the user equipment has been offloaded to another packet data network gateway according to the preferred embodiment of the present invention.

When the network has offloaded the UE to another PDN-GW, the network can terminate the non-3GPP radio access connection of the UE. The advantage of this embodiment is that, since an indication that the UE has been offloaded is transmitted over the non-3GPP radio access network, signaling used between the UE and MME on the 3GPP radio access network is not changed. FIG. 7 shows a message sequence for describing a PDN disconnection procedure triggered by the network when the UE has been offloaded to another PDN-GW.

In this embodiment, it is assumed that both interfaces (IF 01000 and IF 01001) of the UE 0100 are connected to the PDN-GW 0104. The IF 01000 is connected to the PDN-GW 0104 through the S-GW 0103 (S0300). The IF 01001 is connected to the PDN-GW 0104 through the ePDG 0105 (S0301). It is also assumed that the UE 0100 has moved to an area outside of a tracking area specified by the network. In a 3GPP system, the network specifies a specific tracking area for the UE. When the UE is located within the specified tracking area, the UE is informed that there is no need to update the network about the location of the UE. When the UE moves away from the specified tracking area, the network has to be updated about a new location of the UE. Using the updated location, the network can specify a new tracking area for the UE.

In this embodiment, since the steps of updating the network on the location of the UE are the same as the steps (S0300 to S0303) described in FIG. 3, redundant description will be omitted (S0700). Since the MME 0102 has detected that the UE has moved to the new location, the MME 0102 can trigger the offload of the UE 0100 to another PDN-GW. This detection may be, but not limited to, a step of causing the MME 0102 to check mapping to see which PDN-GW is in charge of a 3GPP cell as the location to which the UE has moved. The MME 0102 sends the UE a detach request message (S0701). In this embodiment, it is assumed that the UE 0100 has only one PDN connection on the IF 01000 and the MME 0102 sends the detach request message. This logic that the MME 0102 sends the detach message to the last PDN connection on the 3GPP radio access is described in Non-Patent Document 3.

When the MME 0102 detaches the UE 0100, the MME 0102 deletes the bearer of the UE 0100 held by the S-GW 0103 and the PDN-GW 0104. The MME 0102 sends a delete bearer command message to the S-GW 0102 to inform the S-GW 0103 that the bearer of the UE 0100 is to be deleted because of the SIPTO (S0702). The delete bearer command message includes a bearer identifier to inform the S-GW 0103 which bearer is to be deleted. Similarly, the S-GW 0103 sends a delete bearer command message to the PDN-GW 0104 to inform the PDN-GW 0104 that the bearer of the UE 0100 is to be deleted (S0703). The PDN-GW 0104 deletes the bearer of the UE 0100 according to the procedure described in Non-Patent Document 6 (S0704). The UE 0100 tries to return the connection to the network to get connectivity to the L-GW 0108. Since this step is the same as the steps (S0308 to S0310) described in FIG. 3, redundant description will be omitted (S0705).

Since the PDN-GW 0104 understands that the UE 0100 has been offloaded to another PDN-GW and that the UE 0100 has the connection to the PDN-GW 0104 through the IF 01001 at present, the PDN-GW 0104 can select the termination of the connection to the IF 01001. One reason for the PDN-GW to terminate the connection to the IF 01001 in a moment is that the PDN-GW 0104 will detect no activity of the UE 0100 using the connection. Another reason for the PDN-GW to terminate the connection to the IF 01001 in a moment is that the network has a policy configured such that the PDN-GW shall terminate all remaining PDN connections to the UE whenever the UE has been offloaded.

Therefore, the PDN-GW 0104 sends the IF 01001 a BRI (Binding Revoke Indication) message indicating that the connection is to be terminated (S0706). In this embodiment, the BRI message includes reason code to inform the UE 0100 that the reason why the connection is terminated is that the UE 0100 has been offloaded to another PDN-GW. The UE 0100 accepts the termination of the connection between the IF 01001 and the PDN-GW 0104, and sends the PDN-GW 0104 a BRA (Binding Revoke Accept) message (S0707). When the connection between the IF 01001 and the PDN-GW 0104 is deleted, the UE 0100 deletes the connection with the ePDG 0105 according to the tunnel disconnect procedure described in Non-Patent Document 7 (S0708).

For the sake of clarity, this embodiment will be described in the following example: The UE 0100 has both a cellular wireless connection and a WLAN wireless connection to the network (the PDN-GW 0104) of the telecommunications carrier at present. The user of the UE 0100 enters a shopping complex and the UE 0100 detects that the cell in charge of the shopping complex is outside of the tracking area. The UE 0100 updates the network to change the location, and the network recognizes that the L-GW 0108 is near the current location of the UE 0100. The network requests the UE 0100 to detach from and reattach to the network to offload the wireless cellular interface of the UE 0100 to the L-GW 0108. When the wireless cellular interface is connected to the L-GW 0108 successfully, the PDN-GW 0104 knowing that the UE 0100 has been offloaded to another PDN-GW detects that the UE remains connected to the PDN-GW 0104 through the WLAN wireless interface. Here, it is assumed that the PDN-GW 0104 always terminate all remaining PDN connections to the UE when the UE has been offloaded. Therefore, the PDN-GW 0104 terminates the connection of the WLAN wireless interface of the UE 0100.

Eighth Embodiment

Handover of n3G Connection to Another PDN-GW by Network

In the previous embodiment (seventh embodiment), it is assumed that the network terminates all remaining non-3GPP radio access connections to the first PDN-GW when the UE has been offloaded to the second PDN-GW. In this embodiment, it is assumed that the network requests the UE to offload the non-3GPP radio access connection from the first PDN-GW to the second PDN-GW. Therefore, the first PDN-GW switches the home agent of the UE from the first PDN-GW to the second PDN-GW by using the procedure described in Non-Patent Document 4. The method for the first PDN-GW to know the second PDN-GW is, but not limited to, a method of causing the first PDN-GW to inquire of a home subscription server (HSS) on the PDN-GW as the offload destination of the UE.

Ninth Embodiment

Procedure for Deciding on Whether UE Desires IFOM After SIPTO

As shown in FIG. 2, there are several decisions made by the UE when the UE has been offloaded from the first PDN-GW to the second PDN-GW. One of the decisions capable of being made by the UE is whether the UE desires to have a simultaneous connection to the second PDN-GW after the UE is offload to the second PDN-GW. FIG. 8 shows another system in the Third Generation Partnership Project (3GPP). When the UE 0100 was connected to the first PDN-GW (PDN-GW 0104) through the non-3GPP radio access network 011, the ePDG 0105 served as a gateway of the UE 0100. After knowing that the IF 01000 has been offloaded to the L-GW 0108, the UE 0100 decides to establish a connection between the IF 01001 and the L-GW 0108.

As mentioned in the first embodiment of the present invention, this decision may be made by referring to the operator policy to check whether an offloaded session is a session communicable by using both a 3GPP connection and a non-3GPP connection, or whether it is a session requiring use of both the 3GPP connection and the non-3GPP connection.

Here, the offloaded session may be a session that was performed on a path to the PDN-GW 0104 through the 3GPP radio access network 010 or a session that was performed on a path to the PDN-GW 0104 through the non-3GPP radio access network 011. For example, when the offloaded session is determined to be the session capable of using both the 3GPP connection and the non-3GPP connection, the UE 0100 establishes a connection between the IF 01001 and the L-GW 0108 for simultaneous connection. Further, the UE 0100 checks the state of the 3G connection through the L-GW 0108, and if the available band, QoS, and the like are determined to be insufficient (inadequate) for the offloaded session, a connection using the non-3G connection for simultaneous connection with the L-GW 0108 may be determined to be established.

Checking the state of the 3G connection is performed by comparing the band the use of which on the 3G connection the UE 0100 is permitted with a band required for the offloaded session. For example, when the permitted band is greater, the non-3G connection is deleted, while when the band required for actual communication is greater, the non-3G connection is maintained. Information on the session done by the UE 0100 may be described in the policy held by the UE 0100. Thus, it is determined whether the non-3G connection is necessary or not based on the situation after the offload is performed, and this can prevent any unnecessary non-3GPP connection from being reserved. As mentioned in the third embodiment of the present invention, the connection with the L-GW 0108 described in this embodiment may be newly established while maintaining the connection established between the non-3GPP connection and the PDN-GW 0104.

Further, it may be done by checking whether there were connections to the PDN-GW 0104 established by both the IF 01000 (3GPP wireless interface) and the IF 01001 (non-3GPP wireless interface) for simultaneous connection before the offload is performed. For example, when there were connections for simultaneous connection, since it means that a session using both the 3GPP connection and the non-3GPP connection existed, it is determined that use of the connections for simultaneous connection is needed continuously after the offload to the L-GW 0108, establishing a connection for simultaneous connection between the IF 01001 and the L-GW 0108.

Usually, even when the UE establishes a connection between the IF 01001 and the L-GW 0108, the non-3GPP gateway of the UE is still the ePDG 0105. This means that every packet exchanged with the IF 01001 must pass through the signaling path S0801. The UE does not recognize whether there is an ePDG closer to the L-GW 0108. For example, if the UE 0100 is aware of the existence of the ePDG 0800, packets exchanged with the IF 01001 will pass through the signaling path S0800. Since the ePDG 0800 is closer to the L-GW 0108, it can be said that the signaling path S0800 is more efficient than the signaling path S0801. One method of measuring efficiency is the number of hops between the ePDG and the L-GW 0108. The closer to the L-GW 0108 it is, the smaller the number of hops will be, meaning that the latency of packets upon passing through a signaling path is lower. Therefore, if the UE is aware of information on the location of the ePDG when SIPTO is performed, this will be beneficial for the UE. One method for the UE acquiring such information is a method of make an inquiry to an ANDSF 0801 about an ePDG closer to the L-GW 0108. It is assumed that such information is configured in the ANDSF 0801.

Figure 9:
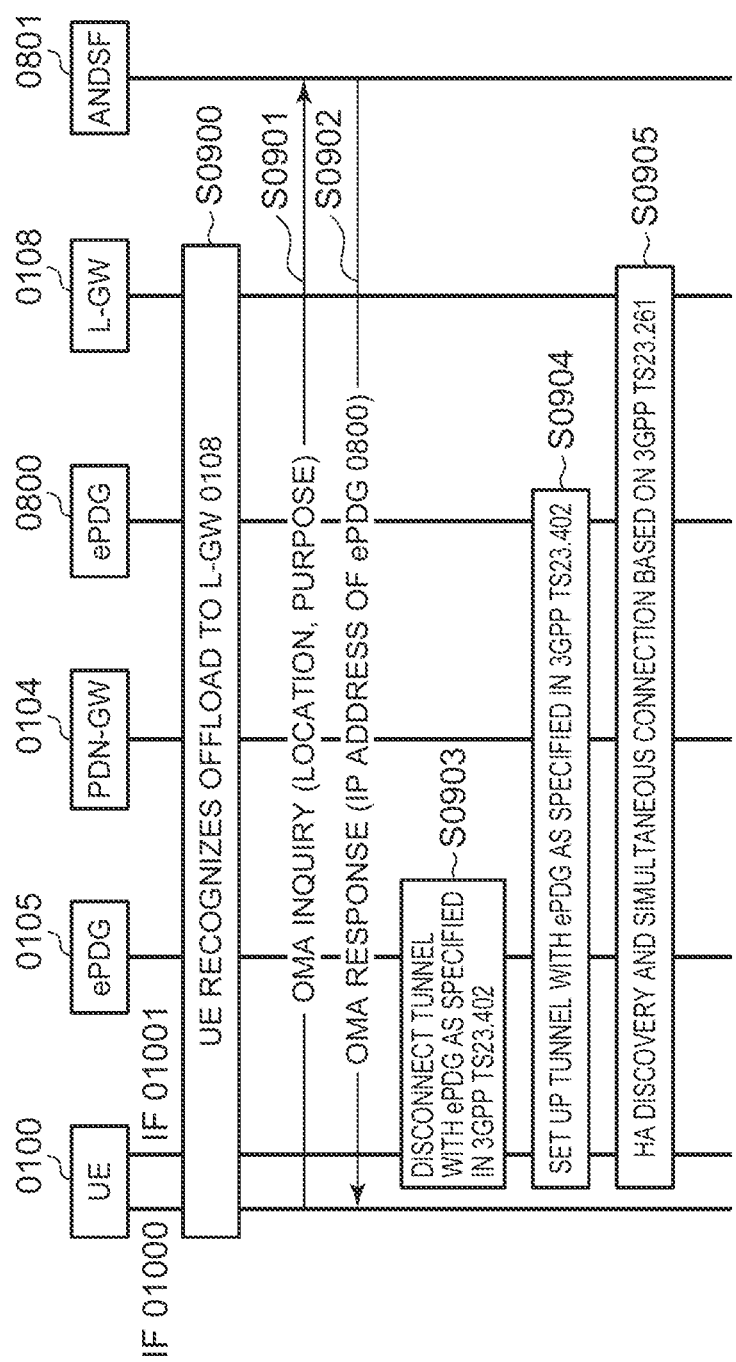
FIG. 9 It is a chart showing a message sequence for describing another procedure in which when offload has been performed, the user equipment requests the network for additional information for simultaneous connection according to the preferred embodiment of the present invention.

FIG. 9 shows a message sequence for describing a procedure in which when offload has been performed, the UE requests the network for additional information for simultaneous connection. In this embodiment, it is assumed that the UE 0100 recognizes that the UE 0100 has been offloaded to the L-GW 0108. It is also assumed that the UE 0100 understands that the user wants to establish simultaneous connections to the L-GW 0108 by using both the IF 01000 and the IF 01001. Further, it is assumed that the UE 0100 is connected to the ANDSF 0801. The UE 0100 sends the ANDSF 0801 an OMA inquiry message including the current location of the UE 0100 and a reason for inquiry (S0901). The location described in the OMA inquiry message may be, but not limited to, cell identification indicated by the IF 01000 or the coordinates of a global positioning system (GPS). The reason described in the OMA inquiry message may be, but not limited to, an indication to the ANDSF 0801 that the UE 0100 looks for an ePDG close to the current location of the UE 0100. The ANDSF 0801 uses the information provided by the UE 0100 to search the database for an ePDG suitable for the UE 0100.

In this embodiment, the ePDG 0800 is identified as the ePDG close to the current location of the UE 0100. The ANDSF 0801 notifies the UE 0100 of the IP address of the ePDG 0800 in an OMA response message (S0902). The UE 0100 is aware that the IP address of the ePDG provided by the ANDSF 0801 is different from the IP address of the current ePDG. Therefore, the UE 0100 deletes the connection with the ePDG 0105 according to the tunnel disconnect procedure described in Non-Patent Document 7 (S0903). After that, the UE 0100 continues the setup of the tunnel according to a tunnel set up procedure described in Non-Patent Document 7 (S0904). When a connection with the ePDG 0800 is established, the UE 0100 continues to discover a home agent according to a simultaneous connection procedure described in Non-Patent Document 1 to make a simultaneous connection to the L-GW 0108 (S0905). In this embodiment, the UE 0100 is not necessarily required to request the network for additional information to switch between ePDGs, the simultaneous connection to the L-GW 0108 may be made through the ePDG 0105. This can prevent the interruption of a session upon switching to the ePDG 0800.

For the sake of clarity, this embodiment will be described in the following example: The UE 0100 is offloaded to the L-GW 0108 in connection with the wireless cellular interface (IF 01000). The user is notified that the UE has been offloaded. The user decides to request the UE 0100 to connect to the WLAN wireless interface (IF 01000) as well. Alternatively, the UE 0100 may have a static policy describing that, when offload has been performed, the UE 0100 shall connect both the cellular and WLAN wireless interfaces to the offloaded PDN-GW. Using a command to make a simultaneous connection, the UE 0100 makes an inquiry to the ANDSF about whether there is an ePDG close to the current location of the UE 0100. When the IP address of the ePDG provided by the ANDSF is different from the IP address of the current ePDG held by the UE 0100, the UE 0100 disconnects from the current ePDG to connect to the ePDG indicated by the ANDSF. This makes sure that the route of the WLAN wireless interface to the offloaded PDN-GW is optimized.

Tenth Embodiment

Alternative Embodiment of Inquiry to ANDSF to Enable UE to Acquire HA Address

In the previous embodiment (ninth embodiment), it is assumed that, when the UE wants to establish a non-3GPP access connection to the offloaded PDN-GW, the UE requests the network for an ePDG close to the current location of the UE. As an optimization, the ANDSF can also provide, to the UE, a home agent address of the offloaded PDN-GW. This eliminates the need for the UE to perform a home agent discovery procedure described in Non-Patent Document 1. For example, the ANDSF 0801 may indicates, in the OMA response message (S0920), an IP address of the L-GW 0108 as a home agent of the UE 0100. The IP address of the ePDG 0800 does not have to be included in the information acquired from the ANDSF. In this case, information (IP address, home prefix) on the L-GW 0108 is provided to the UE 0100.

Eleventh Embodiment

Inquiry From UE to DNS to Acquire Address of Nearby ePDG

In the previous embodiment (ninth embodiment), it is assumed that, when the UE wants to establish a non-3GPP access connection to the offloaded PDN-GW, the UE requests the network for an ePDG close to the current location of the UE. In this embodiment, a domain name server (DNS) can be configured to provide, to the UE, an ePDG close to the current location of the UE. As an example, the DNS has database mapping of ePDGs and the relative positions. When the UE provides, to the DNS, its current location (e.g., 3GPP wireless cell, GPS coordinates, or cell ID), the DNS can use the database and the current location of the UE to provide a suitable ePDG close to the UE. The UE 0100 can also use the DNS to acquire the IP address of the L-GW 0108.

Twelfth Embodiment

Network Terminates ePDG Connection

In the previous embodiments (ninth to eleventh embodiments), it is assumed that the UE requests the network for an ePDG close to the current location of the UE. In this embodiment, when triggering SIPTO, the network can terminate the ePDG connection held by the UE. The network causes the UE to disconnect from the ePDG and provides, to the UE, an ePDG in consideration of the current location of the UE so that the network will switch to the optimum route when the UE tries to connect to the offloaded PDN-GW using non-3GPP access.

13th Embodiment

Network Terminates ePDG Connection and Gives Notice of New ePDG Address

Figure 10:
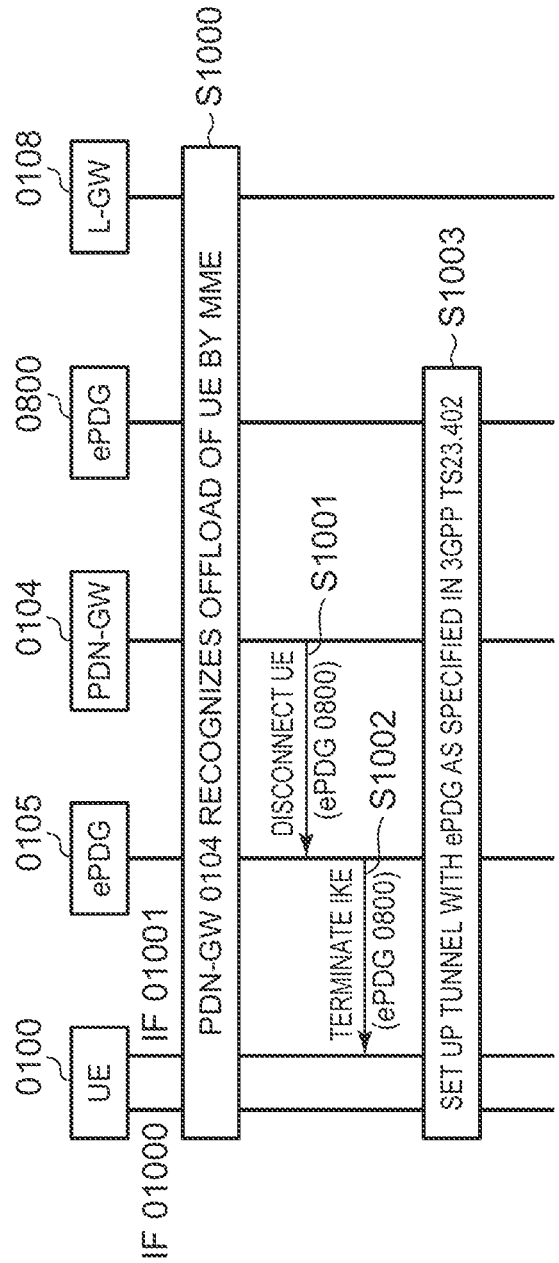
FIG. 10 It is a chart showing a message sequence for describing still another procedure of the network to indicate a target evolved type packet data gateway to the user equipment according to the preferred embodiment of the present invention.

In the previous embodiment (twelfth embodiment), it is assumed that the network terminates the connection of the UE to the ePDG and as a result, the UE executes discovery of a new ePDG. In this embodiment, it is assumed that the network can have information on an ePDG appropriate as a switching destination and can notify the UE of the information. FIG. 10 shows a message sequence for describing a procedure of the network to indicate a target ePDG to the UE.

In this embodiment, it is assumed that the UE 0100 is aware that the UE 0100 has been offloaded to the L-GW 0108 (S1000). It is also assumed that the UE 0100 has a connection with the PDN-GW 0104 using the IF 01001 through the ePDG 0105. The PDN-GW 0104 notifies the ePDG 0105 that the UE 0100 has been offloaded to another PDN-GW, and requests the ePDG 0105 to terminate the connection of the UE 0100 to the ePDG 0105 (S1001). Further, when the UE desires to establish a connection using the non-3GPP radio access, the PDN-GW 0104 informs the ePDG to notify the UE 0100 that the ePDG 0800 is an ePDG as a switching target. The PDN-GW 0104 can know a target ePDG address based on a query to a central database to retrieve such information. The ePDG 0105 terminates the connection with the UE 0100 and informs the UE 0100 that the target ePDG is the ePDG 0800 at present. When the UE desires to use the non- 3GPP radio access, the UE 0100 connects to the ePDG 0800. The PDN-GW 0104 and the ePDG 0105 may also give notice of the IP address of the PDN-GW as the offload destination together.

14th Embodiment

Network Gives Notice of New ePDG Address Without Terminating ePDG Connection

In the previous embodiment (13th embodiment), it is assumed that the network terminates the connection of the UE with the ePDG and informs the UE of a new target ePDG as the destination. However, if the UE has different PDN connections to other PDN-GWs, such a termination will also interrupt sessions with these other PDN-GWs. Therefore, in this embodiment, the ePDG notifies the UE 0100 of a target ePDG (ePDG 0800) closer to the UE 0100 instead of the termination of the connection to the UE 0100 by the ePDG 0105. The selection of whether the UE 0100 switches between ePDGs is left to the decision made by the UE 0100. This enables the UE 0100 to consider whether to have a connection to another PDN-GW on the same ePDG. The ePDG 0105 may also give notice of the IP address of the PDN-GW as the offload destination together.

15th Embodiment

New Parameter is Used in Detach Request

In the previous embodiments, it is assumed that the network sends the UE a detach request including SIPTO type indicating that the UE has been offloaded to another PDN-GW. In this embodiment, the detach request can include a new parameter (e.g., element value of detach type information) without a reattach indication from the network. As described in Non-Patent Document 3 so far, the UE that has confirmed the reattach indication in the detach request message will ignore all parameters in the detach message. Therefore, use of a new parameter meets the purpose of informing the UE that reattach needs performing even without the reattach indication in the detach request message.

16th Embodiment

Bearer Deactivation is Used Instead of Detach

In the previous embodiments, it is assumed that the UE has only one PDN connection on the 3GPP radio access network, and the MME sends a detach request to offload the UE to another PDN-GW. This logic that the MME sends the detach message to the last PDN connection on the 3GPP radio access is described in Non-Patent Document 3. When the UE has two or more PDN connections on the 3GPP radio access network, the MME can use a deactivate bearer message to offload the UE to another PDN-GW. An indication to the UE that the UE has been offloaded because of SIPTO can be carried to the UE through a protocol configuration option (PCO) in the deactivate bearer message.

17th Embodiment

Flow Policy for TFT when there is No ePDG Near UE

In the previous embodiments, it is assumed that the network can provide, to the UE 0100, an ePDG located near the UE 0100 after the UE 0100 is offloaded. In this case, the UE 0100 uses the ePDG notified by the network to establish a connection using the non-3GPP radio access. On the other hand, when the network cannot provide an ePDG close to the current location of the UE 0100, i.e., when the UE 0100 continues the connection to an ePDG before being offloaded, the network can use a flow policy to ensure that these sessions of the UE 0100 required to be optimized by offload use optimum paths set by the network. In the flow policy, an interface to which a specific flow is to be forwarded is described. The UE 0100 generates a routing filter by using the flow policy set by the network and sets it in the home agent so that routing with the intention of the network surely reflected can be maintained. Alternatively, the network can use a traffic flow template (TFT) to ensure that these sessions of the UE 0100 required to be optimized by offload will use optimum paths set by the network.

Further, even after the 3GPP connection of the UE 0100 is offloaded to the L-GW 0108, the UE 0100 can maintain the connection to the P-GW 0104 using the non-3GPP radio access (IF 01001). For example, when communication on the non-3GPP radio access performed before the 3GPP connection is offload is determined to be a flow to continuously use a path through the P-GW 0104 or a flow that cannot be switched to a path through the L-GW 0108, the UE 0100 maintains the connection of the non-3GPP radio access.

Further, as another example, when there are sessions in communication on 3GPP, which cannot be offloaded to the L-GW 0108 and for which communication on non-3GPP can be performed, the connection of the non-3GPP radio access is maintained. In this case, the network can use the flow policy to ensure that these sessions of the UE required to be optimized by offload use optimum paths set by the network. The UE generates a routing filter by using the flow policy set by the network and sets it in the home agent so that routing with the intention of the network surely reflected can be maintained. Alternatively, the network can use the traffic flow template (TFT) to ensure that these sessions of the UE required to be optimized by offload use optimum paths set by the network.

18th Embodiment

PDN-GW Checks IKE Address

In the previous embodiments, it is assumed that when the network redirects the UE to another ePDG, the UE uses the notified ePDG upon connection using the non-3GPP radio access. However, legacy UE may not understand such a redirect message and hence continue to use the current ePDG for a non-3GPP radio access connection. In this embodiment, it is proposed that a home agent checks an IKE message sent from the UE to the home agent to set up a non-3GPP radio access connection. The home agent can estimate the location of an ePDG based on the source address of the IKE message and information indicating which ePDG manages the IP address. Therefore, the home agent can reject a UE connection request requiring non-3GPP radio access when the home agent identifies that the ePDG is not close.

19th Embodiment

UE Deletes Filter from First PDN-GW when being Offloaded

In the previous embodiments, it is assumed that, when the UE has been offloaded from the first PDN-GW to the second PDN-GW, the UE can continue to use the first PDN-GW for the non-3GPP radio access connection. When the 3GPP radio access connection of the UE has been offloaded to the second PDN-GW, if the UE no longer uses a routing filter on the first PDN-GW, it will be useful for the UE to delete every routing filter on the first PDN-GW. Since such a filter rule is not used by the UE after this, this is useful to release the resources of the first PDN-GW.

20th Embodiment

Binding Revoke Message Includes Information for Instructing UE not to Perform IFOM In the previous embodiments, it is assumed that, when the network desires to delete the non-3GPP radio access connection of the UE, the home agent sends a BRI message in which it is reasoned that the revoke is to offload the UE to another PDN-GW. In this embodiment, the home agent can include, in the BRI message, information indicating that, when the network has triggered the offload, the UE must not effectuate the non-3GPP radio access connection. Setting such a strict limitation, the network can ensure that the UE never effectuate an unoptimized non-3GPP radio access connection (i.e., congested route) when the network has triggered the offload. Therefore, the UE will understand from this reason code that SIPTO is given preference over the functions of the UE connected to the non-3GPP radio access network. When SIPTO is triggered, the UE cannot use the non-3GPP radio access connection. Further, the network can include added information in the BRI message to the UE. This information may be, but not limited to, the IP addresses of one or more HAs or the IP addresses of one or more target ePDGs for which SIPTO has been triggered.

21st Embodiment

Network does not Indicate that SIPTO has been Triggered

In the previous embodiments, it is assumed that when the network desires to offload the UE to another PDN-GW, the network notifies the UE that the UE has been offloaded to another PDN-GW. This is achieved by causing the MME to send an indication of SIPTO type in a detach request message or the PDN-GW to add SIPTO reason code in a BRI message. In this embodiment, the UE does not receive such an indication from the network but can understand a possibility that SIPTO has been triggered by the network. For example, when the UE detects that a prefix assigned after detach and reattach procedures ordered by the network has been changed, the UE can consider that the network has triggered SIPTO. Therefore, the UE can use the logic shown in FIG. 2 to determine a processing method for a non-3GPP access connection (if any) of the UE. In the above example, it is assumed that, after the detach procedure, the UE remembers a previously assigned prefix so that the UE can estimate the possibility that the network has triggered SIPTO.

22nd Embodiment

Application to Normal Relocation of P-GW

In the previous embodiments, it is assumed that a trigger of offload of the UE to another PDN-GW by the network is based on SIPTO. However, based on a change in the type of radio access by the UE or roaming to a visited PLMN (VPLMN), the network can offload the UE to another PDN-GW. For example, the UE has both cellular and WLAN wireless interfaces connected to a PDN-GW currently existing in the home PLMN (HPLMN). The wireless cellular interface of the UE is roamed to the VPLMN, and the VPLMN decides to provide a PDN-GW to the UE rather than the HPLMN. This concept is known as local breakout in the 3GPP as described in Non-Patent Document 6. The decision to perform local breakout for the UE may be, but not limited to, an entry in an HSS to indicate whether the UE can perform local breakout upon roaming. Thus, when the VPLMN triggers local breakout, the wireless cellular interface of the UE is offloaded to the PDN-GW of the VPLMN. Therefore, the UE can use the logic shown in FIG. 2 to determine the method of processing the WLAN wireless connection of the UE.

23rd Embodiment

Network Requests UE to Terminate PDN Connection

Figure 12:
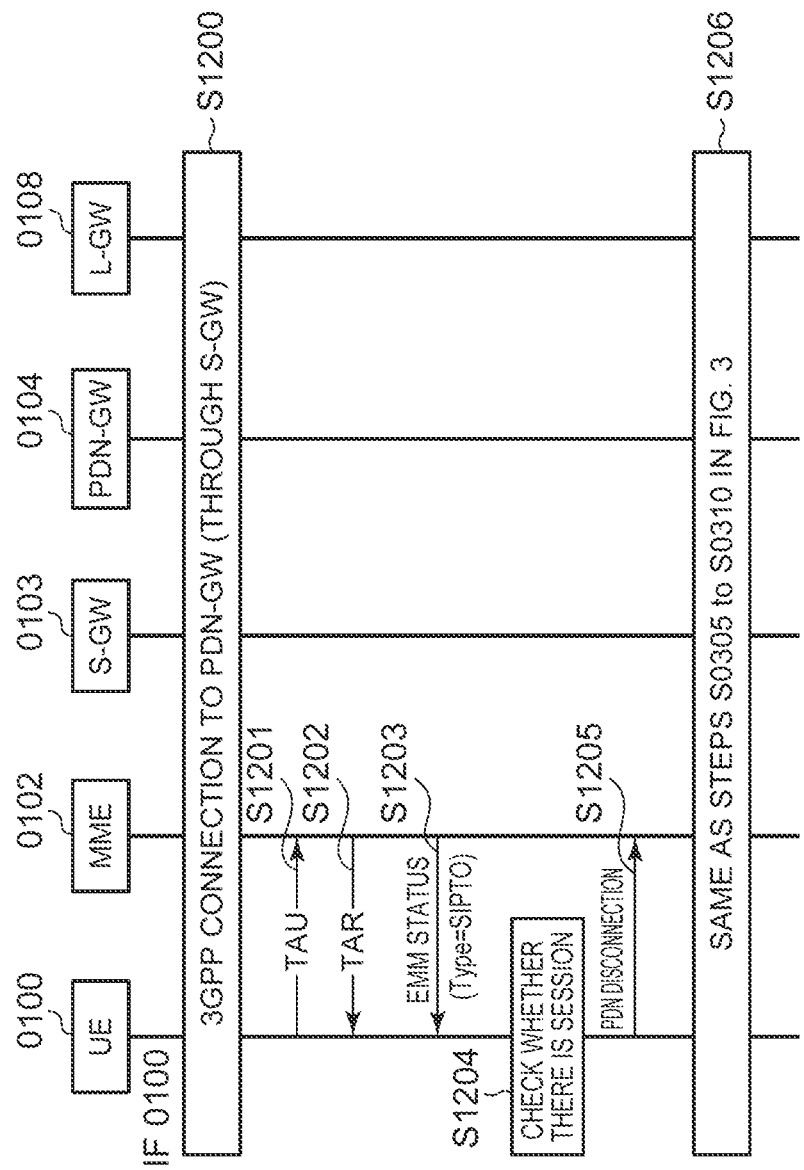
FIG. 12 It is a chart showing a message sequence in which upon offload, the network requests the user equipment to disconnect a PDN connection according to the preferred embodiment of the present invention.

In the previous embodiments, it is assumed that the UE 0100 holds one PDN connection on the 3GPP radio access network. Therefore, the MME sends a detach request to request the UE for offload to another PDN-GW. The detach message is sent to the last PDN connection on the 3GPP radio access as specified in Non-Patent Document 3. However, the network can also request the UE 0100 to terminate a connection to the PDN-GW instead of detaching from the 3GPP network. FIG. 12 shows a message sequence in which, when the UE 0100 is offloaded to another PDN-GW (L-GW 0108), the network requests the UE 0100 to disconnect a PDN connection to the PDN-GW 0104.

In this embodiment, it is assumed that the UE 0100 has one communication interface (IF 01000) and holds a connection to the PDN-GW 0104. On the IF 01000, a connection to the PDN-GW 0104 through the S-GW 0103 is established (S1200). Further, it is assumed that the UE 0100 has moved to an area outside of a tracking area specified by the network. In a 3GPP system, the network defines an area called a tracking area. When the UE is located within a specific tracking area, there is no need to update the network about the location of the UE. When the UE moves away from the specified tracking area, the network has to be updated about a new location of the UE. Using the updated location, the network can specify a new tracking area for the UE.

The UE 0100 detects that it has moved into a cell that is not specified in the tracking area specified by the network, and sends a Tracking Area Update (TAU) message to the MME 0102 (S1201). In this embodiment, it is assumed that the IF 0100 has moved into a communication area of the eNB 0107. This TAU message includes a cell identifier of the destination cell to inform the MME 0102 that the UE 0100 has moved into the cell outside of the tracking area specified by the network. After verifying the TAU message from the UE 0100, the MME 0102 accepts the TAU message from the UE 0100 and responds with a Tracking Area Accept (TAR) message (S0303). This TAR message includes a new tracking area defined by the network for the UE 0100. Through the TAU message received from the UE, since the MME 0102 detects that the UE has moved to the new location, the MME 0102 can trigger a procedure to offload the UE 0100 to another PDN-GW.

This detection may be, but not limited to, a step of causing the MME 0102 to check mapping to see which PDN-GW is in charge of a 3GPP cell as the location to which the UE has moved. The MME 0102 sends the UE 0100 an EMM status message including a new notification (SIPTO type) for informing the UE 0100 that the network is requesting the UE 0100 to perform SIPTO (S1203). Further, the MME 0102 starts a timer when sending the EMM status message. This timer is stopped when a response message (S1205 to be described later) to the EMM status message sent from the UE 0100. Use of this timer eliminates the need for the MME 0102 to wait until the UE 0100 is disconnected from the PDN-GW 0104. In other words, when the timer has expired without any response received by the MME 0102 from the UE 0100, the MME 0102 deletes the PDN connection of the UE 0100. Note that the PDN connection to be deleted is limited to any PDN connection other than the last PDN connection from the operator to the network.

The UE 0100 checks sessions in progress to determine whether there is any important session that can be affected by offload to another PDN-GW (S1204). In this embodiment, since the UE 0100 does not specify the important session, the UE 0100 sends the MME 0102 a message for terminating the PDN connection (S1205). Since steps of offloading the UE 0100 to the L-GW 0108 are the same as the steps (S0305 to S0310) shown in FIG. 3, redundant description will be omitted.

24th Embodiment

Network Requests UE Having One Interface to Terminate PDN Connection

In the previous embodiment, it is assumed that the UE 0100 does not have the important session when the network has triggered offload. However, in S1204 of FIG. 12, the UE 0100 may specify the important session affected by the offload to another PDN-GW. In this embodiment, when the UE 0100 has the important session, the UE 0100 sends an EMM status message to the MME 0102 to notify the MME 0102 of disconnection from the PDN-GW 0104 at the time of ending the session.

For example, suppose that the UE 0100 has a session related to Internet Banking. The session with Internet Banking is associated with an authenticated user and an IP address assigned by the PDN-GW 0104 to the IF 01000. The UE 0100 moves into an area of a femto cell (home eNB) having the function of a local PDN-GW (L-GW 0108). The network decides to offload all Internet traffic of the UE to the L-GW 0108. If the UE 0100 has been offloaded to the L-GW 0108, a new IP address is assigned to the IF 01000. Since this new IP address is different from the authenticated IP address associated with the session with Internet Banking in progress, the session cannot be continued. Therefore, the UE 0100 needs to request the user to start a new authentication session again.

Use of a technique mentioned in this embodiment can eliminate the need to do the new authentication session when the UE is offloaded to another PDN-GW. In other words, the UE 0100 notifies the MME 0102 that it maintains an important session so that the UE 0100 can terminate the important session before being offloaded to another PDN-GW. Upon termination of the important session, the UE 0100 sends the MME 0102 a PDN disconnection message to notify the MME 0102 that the UE 0100 is ready to be offloaded to another PDN-GW.

25th Embodiment

Devices-UE and PDN-GW

Figure 11:
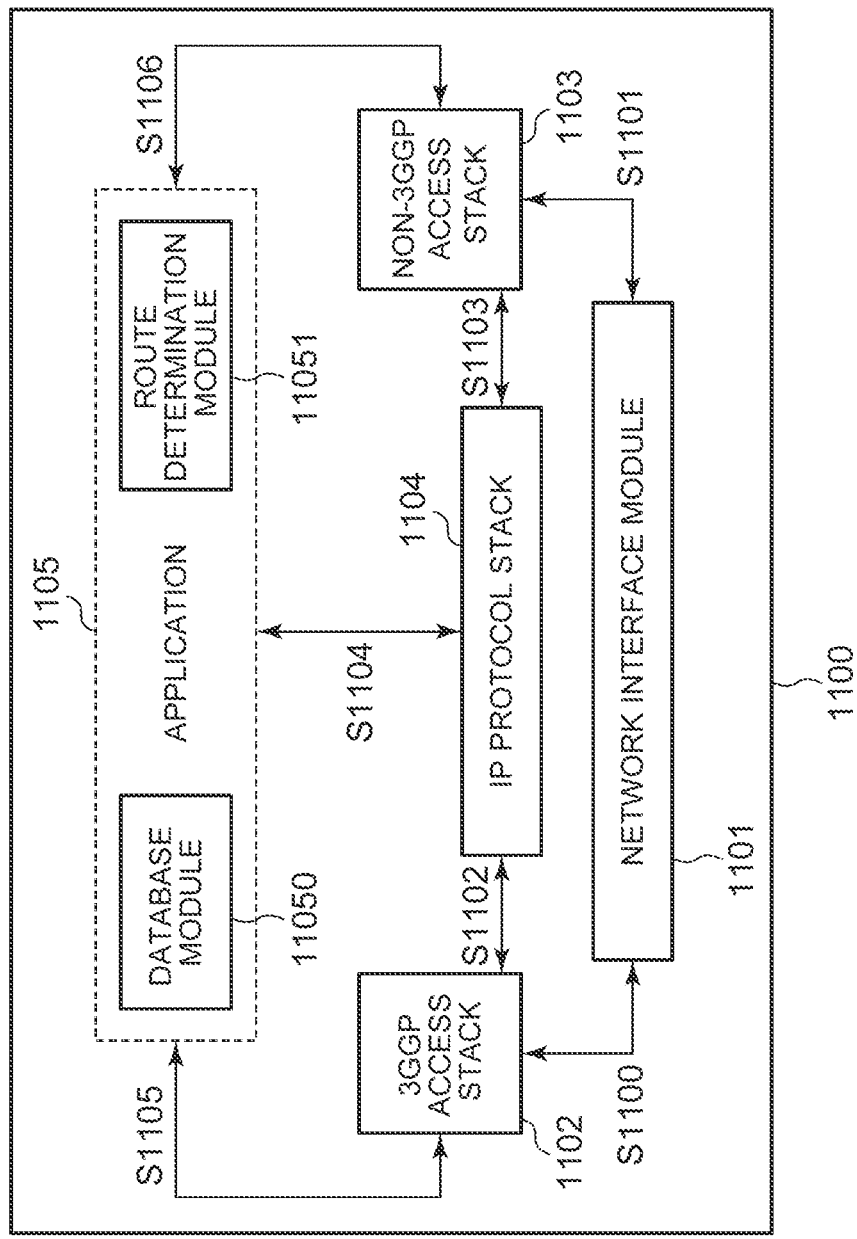
FIG. 11 It is a diagram showing the functional architecture of a preferred device according to the present invention.

FIG. 11 shows a functional architecture 1100 of a preferred device (e.g., UE 0100) including a network interface module 1101, a 3GPP access stack 1102, a non-3GPP access stack 1103, an IP protocol stack 1104, and an application 1105. This preferred device may be, but not limited to, any mobile electronic communication device, such as a cellular phone or a laptop, for various preferred embodiments of the present invention.

The network interface module 1101 is a functional block including all hardware and software necessary for the preferred device for communicating with another node through any communication medium. Using known terminology in the art, the network interface module 1101 represents a communication component, firmware, a driver, and communication protocols of layer 1 (physical layer) and layer 2 (data link layer). It will be apparent to those skilled in the art that the functional architecture 1100 includes one or more network interface modules 1101. Using a signal/data path S1100, the network interface module 1101 can provide trigger/packet transmission to the 3GPP access stack 1102. For example, the network interface module 1101 sends any received NAS message (e.g., detach request message including SIPTO type) to the 3GPP access stack 1102 so that the message will be processed.

Further, using the signal/data path S1100, the 3GPP access stack 1102 can pass any NAS message (e.g., attach request message), desired to be sent to a network, to the network interface module 1101 for transmission. Using a signal/data path S1101, the network interface module 1101 can provide trigger/packet transmission to the non-3GPP access stack 1103. For example, network interface module 1101 sends any received IKE message to the non-3GPP access stack 1103 so that the message will be processed. Further, using the signal/data path S1101, the non-3GPP access stack 1103 can pass any IKE message to the network interface module 1101 for sending the message to the network.

The 3GPP access stack 1102 is a functional block for managing communication between the UE and a network on a 3GPP radio access network. While a wireless cellular interface of the UE is roaming around in the 3GPP radio access network, the 3GPP access stack 1102 processes the mobility of the UE and the mode of session. Using a signal/data path S1102, the 3GPP access stack 1102 can provide trigger/packet transmission to the IP protocol stack 1104. For example, when the network assigns an IP address or prefix to the wireless cellular interface of the UE, this IP address or prefix is carried on an NAS message. The 3GPP access stack 1102 passes, to the IP protocol stack 1104, the IP address or prefix for the subsequent processing.

Further, using the signal/data path S1102, the IP protocol stack 1104 can pass any IP packet, desired to be sent to the network, to the 3GPP access stack 1102 for formatting. Using a signal/data path S1105, the 3GPP access stack 1102 can provide trigger/packet transmission to the application 1105. For example, when the network assigns a temporary identifier (GUTI) used by the UE within the 3GPP radio access network, the 3GPP access stack 1102 passes GUTI to the application 1105 for storing it in a database module 11050. Further, using the signal/data path S1105, the 3GPP access stack 1102 can inquire of the application 1105 about GUTI upon authentication of the 3GPP radio access network.

The non-3GPP access stack 1103 is a functional block for managing communication between the UE and the network on a non-3GPP radio access network. While a WLAN wireless interface of the UE is roaming around in the non-3GPP access stack 1103, the non-3GPP access stack 1103 processes the mobility and security of the UE. Using a signal/data path S1103, the non-3GPP access stack 1103 can provide trigger/packet transmission to the IP protocol stack 1104. For example, when the network assigns an IP address or prefix to the WLAN wireless interface of the UE, this IP address or prefix is carried on an IKE message. The non-3GPP access stack 1103 passes, to the IP protocol stack 1104, the IP address or prefix for the subsequent processing.

Further, using the signal/data path S1103, the IP protocol stack 1104 can pass any IP packet, desired to be sent to the network, to the non-3GPP access stack 1103 for formatting. Using a signal/data path S1106, the non-3GPP access stack 1103 can provide trigger/packet transmission to the application 1105. For example, when the network assigns a mobile node identifier (MN-ID) used by the UE within the non-3GPP radio access network, the non-3GPP access stack 1103 passes MN-ID to the application 1105 for storing it in the database module 11050. Further, using the signal/data path S1105, the non-3GPP access stack 1103 can inquire of the application 1105 about MN-ID upon authentication of the non-3GPP radio access network.

The IP protocol stack 1104 is a functional block including software for implementing an internet protocol for enabling the UE to communicate with another node on the global internet in the cellular network. The IP protocol stack 1104, may include, but not limited to, mobile IPv4 or mobile IPv6 related to a mobility function. Using a signal/data path S1104, the IP protocol stack 1104 can provide trigger/packet transmission to the application 1105. For example, when receiving an IP packet including a data payload for a specific application (e.g., a web browser), the IP protocol stack 1104 passes the data payload to the web browser application. Further, using the signal/data path S1104, the application 1105 can pass, from the application to the IP protocol stack 1104, a data payload to format the IP packet to an IP packet for transmission.

The application 1105 is a functional block including all protocols and programs located in the uppermost network layer in a communication stack. This includes any transport or session layer protocols, such as a transmission control protocol (TCP), a stream control transport protocol (SCTP), and a user datagram protocol (UDP), or programs and software necessary to communicate with another node. The application 1105 further includes the database module 11050 and a route determination module 11051. The database module 11050 stores information necessary for the functional architecture 1100 to make a request therefor. An example of such information may be, but not limited to, a mobile IPv6 binding entry for the UE 0100.

The present invention introduces the route determination module 11051 aiming to determine whether any existing communication path is affected when the UE has been offloaded to another PDN-GW. For example, when receiving an indication that the UE 0100 has been offloaded to another PDN-GW from either the 3GPP access stack 1102 or the non-3GPP access stack 1103, the route determination module 11051 checks the current mobile IPv6 binding entry held by the UE 0100 obtained from the database module 11050. Using the logic described in the above embodiments, the route determination module 11051 decides on whether there is a need to forward the existing communication path of the UE to the offloaded PDN-GW. When there is the need, the route determination module 11051 triggers the 3GPP access stack 1102 or the non-3GPP access stack 1103 or the IP protocol stack 1104 to move the existing communication path of the UE to the offloaded PDN-GW.

In this embodiment, the functional architecture 1100 of the preferred device means user equipment (e.g., UE 0100). However, An architecture similar to this functional architecture 1100 can also be applied, but not limited, to any server communication device, such as a packet data network gateway or a serving gateway, for various preferred embodiments of the present invention.

26th Embodiment

Another Usage Example in Which UE Terminates Connection with non-3GPP (non-3GPP)

In the above embodiment (second embodiment), it is assumed that the UE has no session in progress on both interfaces (IF 01000 and IF 01001) of the UE 0100 when offload is triggered by the network. Therefore, based on the fact that there is no session in progress on the IF 01001, the UE 0100 determines to delete the connection between the IF 01001 and the PDN-GW 0104. However, the determination to delete the connection between the IF 01001 and the PDN-GW 0104 may be made based on the fact that the UE 0100 is aware that the MME 0102 has no means for deleting the connection of the UE 0100 to the PDN-GW 0104 through the IF 01001 when SIPTO is triggered. One method for the UE 0100 to recognize this is that the MME 0102 includes, in an NAS message to the UE 0100, an explicit notification that SIPTO is triggered. Another method for the UE 0100 to recognize this is that the UE 0100 receives, from the MME 0102, a detach message including a cause value for requesting reattach so that the UE 0100 can estimate that the reason for the MME 0102 to send such a message is because of SIPTO. Still another method for the UE 0100 to recognize this is that the UE 0100 receives, from the MME 0102, a deactivate bearer message including a cause value for requesting deactivation so that the UE 0100 can estimate that the reason for the MME 0102 to send such a message is because of SIPTO. Thus, the UE 0100 determines to delete the connection between the IF 01001 and the PDN-GW 0104 when recognizing that SIPTO has been triggered.

For the sake of clarity, this embodiment will be described in the following example: The UE 0100 has both a cellular wireless connection and a WLAN wireless connection to the network (PDN-GW 0104) of the telecommunications carrier at present, having data sessions in progress with the CN 0106 on both interfaces. The user of the UE 0100 enters a shopping complex and the UE 0100 detects that the cell in charge of the shopping complex is outside of the tracking area. When the UE 0100 updates the network to change the location, the network recognizes that the L-GW 0108 is near the current location of the UE 0100. The network requests the UE 0100 to detach from and reattach to the network to offload the connection of the UE to the PDN-GW (through the wireless cellular interface). The UE 0100 that received a detach message including the cause of reattach estimates that the MME 0102 is triggering SIPTO. Since the UE 0100 recognizes that the MME 0102 cannot trigger the deletion of the WLAN wireless connection of the UE 0100, the UE 0100 sends a binding update with lifetime set to "zero" to the PDN-GW 0104 through the WLAN wireless interface, and determines to terminate the WLAN wireless connection.

27th Embodiment

UE Determines on Which Interface Connection is Set up

In some of the above embodiments (second and 26th embodiments), when the MME 0102 sends the UE 0100 a detach request message including a cause value (Cause) to request reattach for SIPTO, the UE 0100 tries to reestablish the connection of the wireless cellular interface to the 3GPP radio access network 012. Further, the UE 0100 deletes the connection of the WLAN wireless interface to the PDN-GW 0104. The reason for the UE 0100 to delete the connection of the WLAN wireless interface is to ensure that SIPTO is applied. If the UE 0100 does not delete the connection of the WLAN wireless interface, since the WLAN wireless connection remains active, such an entry that the current PDN-GW of the UE 0100 is the PDN-GW 0104 will be left intact in the database of the HSS. In this case, when the UE 0100 sends an attach request message for the wireless cellular interface according to a request from the MME 0102, the MME 0102 negotiates with the HSS about the selection of a PDN-GW. When SIPTO is triggered, the MME 0102 tries to select the L-GW 0108. However, since the database of the HSS indicates that the PDN-GW 0104 is the current PDN-GW for the UE 0100, the MME 0102 selects the PDN-GW 0104 for the wireless cellular interface of the UE 0100 according to the information provided from the HSS. This means that SIPTO cannot be applied well.

Figure 13:
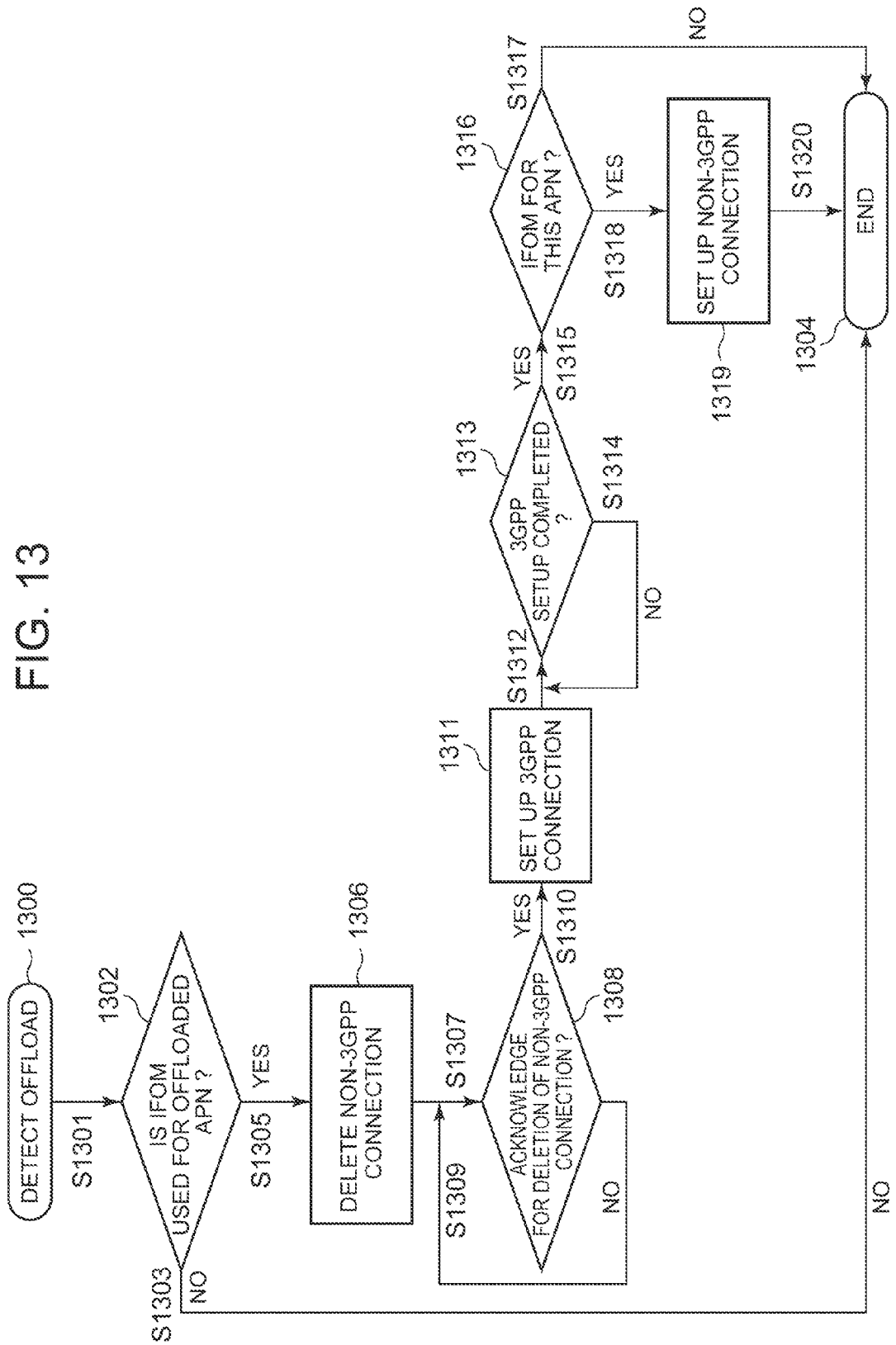
FIG. 13 It is a flowchart for a determination method practiced by the user equipment to ensure that offload triggered by the network can be applied according to the preferred embodiment of the present invention.

Therefore, in this embodiment, in order to ensure SIPTO is applied, the UE 0100 must determine a method of reestablishing the connection to ensure that SIPTO is applied. FIG. 13 is a flowchart for a determination method practiced by the UE to ensure that offload triggered by the network can be applied.

In FIG. 13, When the UE 0100 detects in step 1300 that offload is triggered by the network, a decision function is started. One method for the UE 0100 to detect this is that the MME 0102 includes, in an NAS message to the UE 0100, an explicit indication that SIPTO is triggered. Another method for the UE 0100 to detect this is that the UE 0100 receives, from the MME 0102, a detach message including the cause of reattach so that the UE 0100 can estimate that the reason for the MME 0102 to send such a message is because of SIPTO. Still another method for the UE 0100 to detect this is that the UE 0100 receives, from the MME 0102, a deactivate bearer message including a cause value (Cause) indicative of deactivation so that the UE 0100 can estimate that the reason for the MME 0102 to send such a message is because of SIPTO.

Next, the decision function checks in step 1302 whether there is any simultaneous connection to an access point name (APN) being offloaded. The mode of simultaneous connection to this APN is also known as IP flow mobility (IFOM), which is used below to show a configuration for connecting to the same APN (PDN-GW) at the same time by using both interfaces IF 01000 and IF 01001. As a result of checking, when the UE 0100 estimates that IFOM is not used for the offloaded APN, a path S1303 is selected, and the decision function is ended at step 1304. As a result of checking, when the UE 0100 estimates that IFOM is used for the offloaded APN, a path S1305 is selected, the decision function deletes in step 1306 the non-3GPP radio access connection between the IF 01001 and the PDN-GW 0104. The method for the UE 0100 to delete the non-3GPP radio access connection may be, but not limited to, transmission of a binding update (BU) with the value of lifetime set to "zero."

When the non-3GPP radio access connection is deleted, the decision function determines in step 1308 whether the non-3GPP radio access connection is deleted and the UE 0100 receives an acknowledge from the PDN-GW 0104. The acknowledge may be, but not limited to, a binding acknowledge (BA) including delete status. When the decision function determines that no acknowledge is received, a path S1309 is selected, and the decision function continues to wait for the acknowledge for a unique period of time. On the other hand, when the decision function determines that the acknowledge is received, a path S1310 is selected, and the decision function triggers, in step 1311, connection setup of the 3GPP radio access connection of the UE 0100. As a result of the above trigger, the UE 0100 sends the MME 0102 an attach request on the IF 01000, but it is not limited thereto.

Next, in step 1313, the decision function checks whether the connection setup of the 3GPP radio access of the UE 0100 is completed. When the connection setup is still in progress, a path S1314 is selected, and the decision function waits for completion of the setup. The determination on completion of the connection setup may be made by, but not limited to, sending an attach complete message from the UE 0100. Upon completion of the setup, a path S1315 is selected, and the decision function determines, in step 1316, whether IFOM can still be applied to the offloaded APN.

The determination on the application of IFOM to the offloaded APN may be made by, but not limited to, a routing policy configured by the telecommunications carrier and stored inside the UE 0100. In the present invention, such a routing policy is called an inter-system routing policy (ISRP). When IFOM cannot be used for the APN upon offload as a result of checking on ISRP, a path S1317 is selected, and the decision function is ended at step 1304. When IFOM can be used for the APN upon offload as a result of checking on ISRP, a path 1318 is selected, and the decision function triggers in step 1319 connection setup of the non-3GPP radio access connection of the UE 0100. As a result of this trigger, the UE 0100 finds a PDN-GW and sets up the connection, but it is not limited thereto. Upon completion of the setup of the non-3GPP radio access connection, a path S1320 is selected, and the decision function is ended at step 1304.

Figure 14:
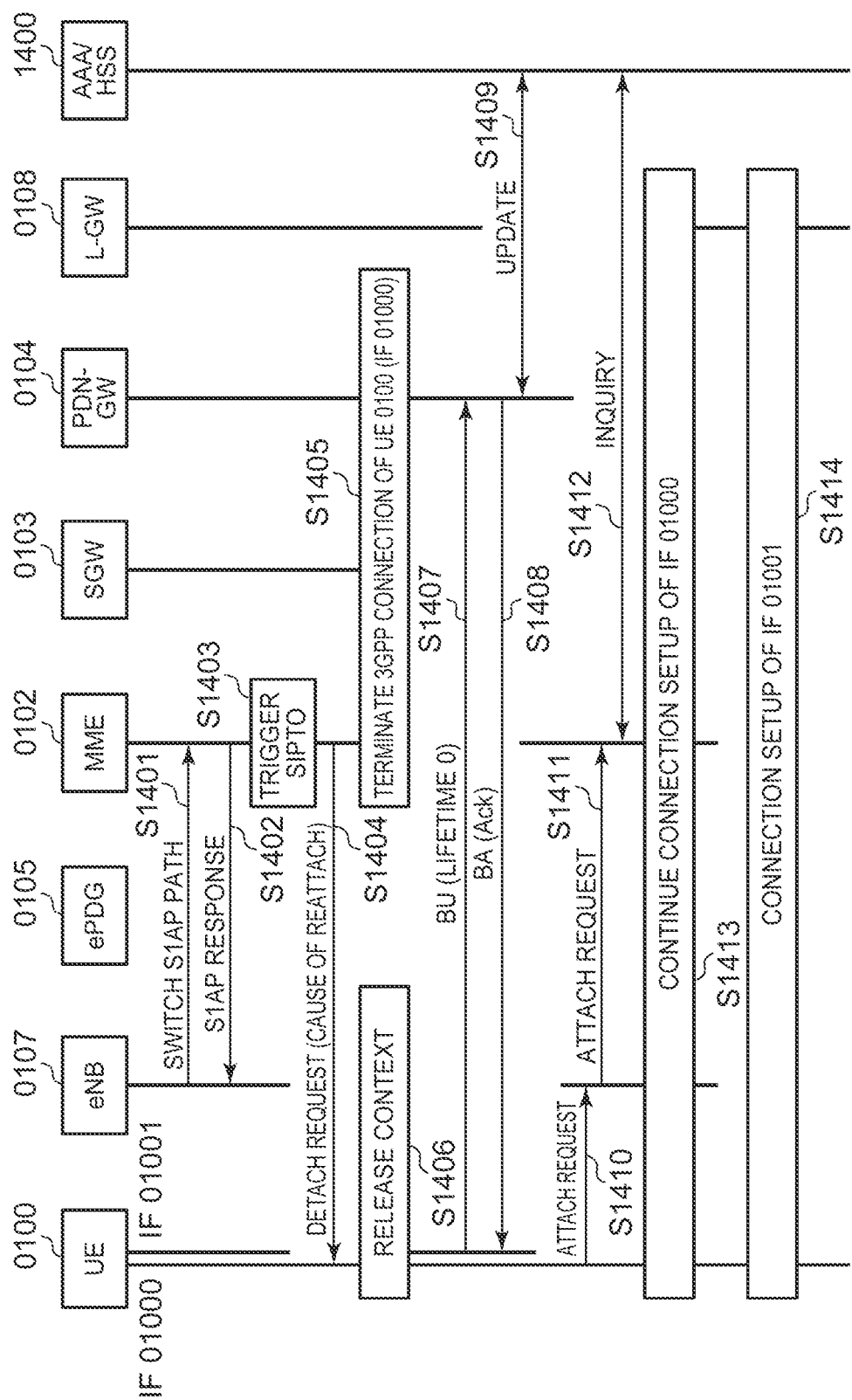
FIG. 14 It is a message sequence chart for describing the result of determination made by the user equipment according to the preferred embodiment of the present invention.

As a result of the determination made by the UE in FIG. 13, the offload triggered by the network can be applied successfully without fail. FIG. 14 is a message sequence chart for describing the result of the determination made by the UE.

In this embodiment, it is assumed that both interfaces (i.e., IF 01000 and IF 01001) of the UE 0100 are connected to the PDN-GW 0104. It is also assumed that the UE 0100 uses both the IF 01000 and the IF 01001 for data communication in progress. This means that the UE 0100 is in CONNECTED mode. When the UE 0100 gets out of a communication range of the eNB 0101 in the CONNECTED mode, the eNB 0101 tries to hand over the connection of the IF 01000 to the eNB 0107. When the UE 0100 is handed over to the eNB 0107, the eNB 0107 sends the MME 0102 an S1AP path switch message to notify the MME 0102 that the eNB 0107 takes care of the 3GPP radio access connection of the UE 0100 (S1401). This processing enables the eNB 0107 to update the MME 0102 about the location of the UE 0100. The MME 0102 responds to the eNB 0107, responding to path switching of the UE 0100 (S1402).

When the MME 0102 is notified of the change in the location of the UE 0100, the MME 0102 determines that the 3GPP radio access connection (i.e., IF 01000) of the UE 0100 can be offloaded to the L-GW 0108. Therefore, the MME 0102 determines to trigger SIPTO to offload the IF 01000 (S1403). The MME 0102 sends the IF 01000 a detach request message including the cause of reattach (S1404). Simultaneously, the MME 0102 starts deleting the 3GPP radio access connection between the IF 01000 to the SGW 0103 and the PDN-GW 0104 (S1405). In general, upon completion of deletion of the 3GPP radio access connection between the IF 01000 to the SGW 0103 and the PDN-GW 0104, the MME 0102 informs an HSS 1400 that the stored identification of the PDN-GW 0104 is to be deleted from a subscription profile (subscriber information) of the UE 0100. However, in this embodiment, the PDN-GW 0104 instructs the MME 0102 not to send the HSS 1400 a message for deleting the identification of the PDN-GW 0104 stored in the HSS 1400 while deletion processing for the 3GPP radio access connection between the IF 01000 to the SGW 0103 and the PDN-GW 0104 is being performed. This is because it is recognized that the UE 0100 has a non-3GPP radio access connection (i.e., IF 01001) to the PDN-GW 0104. Similarly, the IF 01000 and the eNB 0107 release the context of the UE 0100 (S1406).

When receiving a detach request message including the cause of reattach, the UE 0100 can estimate that the MME 0102 is triggering offload of IF 01000 connected to the PDN-GW 0104. The UE 0100 determines that the IF 01001 is also connected to the PDN-GW 0104. Then, the UE 0100 determines to terminate the non-3GPP radio access connection between the IF 01001 and the PDN-GW 0104. By this processing, the offload triggered by the network can be applied successfully without fail. The UE 0100 sends the PDN-GW 0104 a BU with the value of lifetime set to "zero" (S1407). The PDN-GW 0104 recognizes that the UE 0100 is in the process of terminating the non-3GPP radio access connection between the IF 01001 and the PDN-GW 0104, and sends back a BA to respond to the request from the UE 0100 (S1408). Next, since there is no connection from the UE 0100 to the PDN-GW 0104, the PDN-GW 0104 updates the AAA/HSS 1400 to delete the identification of the PDN-GW 0104 stored in the subscription information on the UE 0100 (S1409).

When receiving the BA, the UE 0100 can start the connection setup for the 3GPP radio access interface (IF 01000). The IF 01000 sends the eNB 0107 an attach request (S1410), and the eNB 0107 sends the MME 0102 the attach request from the UE 0100 (S1411). The MME 0102 inquires of the HSS 1400 to check whether there is a PDN-GW assigned to the UE 0100 (S1412). Since the identification information on the PDN-GW 0104 is deleted in S1409, the subscription information on the UE 0100 includes no identification information on every PDN-GW. The MME 0102 selects a PDN-GW as an offload destination of the UE 0100. In this embodiment, the MME 0102 selects the L-GW 0108. The connection setup of the IF 01000 continues in S1413, and the MME 0102 eventually updates the PDN-GW identification information on the UE 0100 to the L-GW 0108. When the UE 0100 determines to use IFOM to the L-GW 0108, the UE 0100 triggers the IF 01001 to set up a connection to the L-GW 0108 (S1414).

28th Embodiment

Alternative Embodiment Concerning on Which Interface Connection is Set up

In the above embodiment (seventh embodiment), the MME 0102 notifies the PDN-GW 0104 that SIPTO is triggering. Therefore, when the PDN-GW 0104 is aware that the UE 0100 also has the non-3GPP radio access connection, the PDN-GW 0104 can start terminating the non-3GPP radio access connection of the UE 0100. In this embodiment, it is assumed that the MME 0102 sends a detach request including the cause of reattach according to S1404 after deleting the 3GPP radio access connection between the IF 01000 to the SGW 0103 and the PDN-GW 0104 according to S1405. In this embodiment, both the 3GPP radio access connection and the non-3GPP radio access connection of the UE 0100 to the same APN may be terminated by the network. This ensures that the UE 0100 is clearly informed that the network is about to offload the UE 0100 to another PDN-GW. Similarly, the UE 0100 can set up the 3GPP radio access connection sequentially before setting up the non-3GPP radio access connection to ensure that the offload triggered by the network can be applied without fail.

In the alternative embodiment of this embodiment, the PDN-GW 0104 can include, in a BRI message to the UE 0100, additional information on whether the selected offload PDN-GW supports IFOM, or the like. Using this information in addition to ISRP, the UE 0100 can determine whether the UE 0100 desires to have IFOM to the selected offload PDN-GW (i.e., L-GW 0108). The information on the ability of a target PDN-GW allows the UE 0100 to avoid redundant signaling.

29th Embodiment

Support for Legacy UE

In all the aforementioned embodiments, the present invention needs to change the functionality of the UE. In this embodiment, the concept of the present invention can be applied to the UE of prior art for this invention. For example, in the seventh embodiment in which the PDN-GW 0104 is aware that the UE 0100 is offloaded to another PDN-GW (i.e., L-GW 0108), the PDN-GW 0104 terminates the non-3GPP radio access connection of the UE 0100. When the UE 0100 is prior-art one for the present invention, the UE 0100 can try to reestablish the non-3GPP radio access connection to the PDN-GW 0104. In this embodiment, the PDN-GW 0104 performs an IKE redirect procedure as specified in Non-Patent Document 7 so that it can try to redirect the UE 0100 to the L-GW 0108. Thus, the non-3GPP radio connection of the UE 0100 is redirected to the L-GW 0108, and this can solve the problem that the UE 0100 maintains the connection to the PDN-GW 0104 even after the network offloads the UE 0100 to another PDN-GW.

As an alternative embodiment of this embodiment for terminating the state of IP mobility upon receiving binding revoke, the PDN-GW 0104 can send the UE 0100 a binding revoke message. The UE 0100 terminates the non-3GPP radio access connection and tries to reestablish the non-3GPP radio access connection. In this embodiment, when the UE 0100 discovers a home agent, the network provides, to the UE 0100, the IP address of the L-GW 0108 as the home agent of the UE 0100 so that it can try to redirect the UE 0100 to the L-GW 0108. Thus, the non-3GPP radio access connection of the UE 0100 is redirected to the L-GW 0108. This can solve the problem that the UE 0100 maintains the connection to the PDN-GW 0104 even after the network offloads the UE 0100 to another PDN-GW.

In another alternative embodiment of this embodiment, both the UE 0100 and the PDN-GW 0104 implement a home agent switch protocol as specified in Non-Patent Document 4. In this embodiment, when there is a need to redirect the UE 0100 to the L-GW 0108, the PDN-GW 0104 sends the UE 0100 a home agent switch message. When the home agent switch message includes the IP address of a target home agent, i.e., of the L-GW 0108, the UE 0100 establishes a non-3GPP radio access connection to the L-GW 0108. When the home agent switch message does not include the IP address of target home agent, i.e., of the L-GW 0108, the UE 0100 performs procedure for discovering the IP address of the home agent. The network provides, to the UE 0100, the IP address of the L-GW 0108 as the home agent of the UE 0100 so that it can try to redirect the UE 0100 to the L-GW 0108. Thus, the non-3GPP radio connection of the UE 0100 is redirected to the L-GW 0108, and this can solve the problem that the UE 0100 maintains the connection to the PDN-GW 0104 even after the network offloads the UE 0100 to another PDN-GW.

30th Embodiment

Use of Another NAS Message for Canceling SIPTO

In the above embodiment (fifth embodiment), it is proposed that the UE can cancel an SIPTO request from the network and the network accepts such a request from the UE. In that embodiment, the UE 0100 responds to the MME 0102 with a detach response message including a cause value indicating that the UE 0100 does not desire SIPTO to send a notification for canceling SIPTO. However, an embodiment of the MME can delete the context of the UE immediately after the transmission of the detach request message. Since the network forces the UE to detach, there is little possibility that the UE does not obey the command from the network. Further, the deletion of the context of the UE by the detach before the UE responds to the network can also be applied to the S-GW and the PDN-GW.

When the UE 0100 sends the MME 0102 a detach response message including a cause value indicating that the UE 0100 does not desire SIPTO, the MME 0102 may no longer have the EPS context of the UE 0100. Since there is no EPS context of the UE 0100, the MME 0102 does not have information for returning any session currently held by the UE 0100 to the PDN-GW 0104. This causes a problem of synchronization error status between the UE 0100 and the MME 0102.

In this embodiment, when the UE 0100 determines use of IFOM for the APN, the UE 0100 notifies the MME 0102 of the preference between IFOM and SIPTO. In this embodiment, the preference between IFOM and SIPTO may be checked by, but not limited to, a user preference policy stored in the UE 0100. Further, in this embodiment, such a preference of the UE 0100 can be signaled by, but not limited to, an EMM (EPS Mobility Management) status information message, a tracking area update request message, an attach request message, or a service request message. When the preference of the UE 0100 is transmitted to the MME 0102, the MME 0102 can consider the preference of the UE 0100 upon determination to trigger SIPTO for the UE 0100. Therefore, when the UE 0100 prefers IFOM to SIPTO, the MME 0102 does not trigger SIPTO for the UE 0100. Thus, in this embodiment, the problem of synchronization error status between the UE 0100 and the MME 0102 does not arise.

31st Embodiment

UE Preference to IFOM Over SIPTO Stored in HSS

In the above embodiment (30th embodiment), it is assumed that the UE notifies the network of the preference between IFOM and SIPTO. However, the preference to IFOM over SIPTO can also be stored in a subscription profile of the network. For example, when the UE 0100 informs the PDN-GW 0104 that it wants to use IFOM, the PDN-GW 0104 notifies the AAA/HSS of the intention of the UE 0100. The AAA/HSS changes the subscription profile of the user of the UE 0100 stored in the HSS to set a SIPTO permission field in the subscription profile of the UE 0100 to Refuse to indicate that the user prefers IFOM to SIPTO. When the MME 0102 retrieves the subscription profile from the HSS and confirms that the SIPTO permission field in the subscription profile of the UE 0100 is set to Refuse, the MME 0102 does not trigger SIPTO for the UE 0100.

32nd Embodiment

Change in UE Preference to IFOM Over SIPTO

In the above embodiment (30th embodiment), it is assumed that the UE notifies the network of the preference between IFOM and SIPTO. Such a notification from the UE can be dynamically changed. For example, the UE 0100 notifies the MME 0102 that IFOM is used for an APN currently connected and preference is given to IFOM over SIPTO. When the UE 0100 stops using IFOM for the APN, i.e., when it stops having simultaneous connections on a multi-access network to the APN, the UE 0100 can delete the preference set in the MME 0102 to indicate that preference is given to IFOM over SIPTO. Therefore, the UE 0100 can send an NAS message to notify the MME 0102 that preference to IFOM over SIPTO is no longer applied. After such preference is deleted in the MME 0102, when the MME 0102 detects that SIPTO can be performed for the UE 0100, the MME 0102 triggers SIPTO for the UE 0100.

In an alternative embodiment of this embodiment, when the UE 0100 sends BU to the PDN-GW 0104 to inform the PDN-GW that the UE 0100 no longer desires to use IFOM, BU can include added information for requesting the PDN-GW to delete the preference of the UE 0100 to IFOM over SIPTO. The PDN-GW 0104 can notify the AAA/HSS of the intention of the UE 0100. The AAA/HSS sets the SIPTO permission field in the subscription profile of the UE 0100 to Permit to change the subscription profile of the UE 0100. Next, the AAA/HSS updates the MME 0102 in the changed subscription profile of the UE 0100. When the MME 0102 confirms that the SIPTO permission field in the subscription profile of the UE 0100 is set to Permit, the MME 0102 can determine to trigger SIPTO for the UE 0100.

In another alternative embodiment of this embodiment, BU sent by the UE 0100 does not need to include the added information for requesting the PDN-GW to delete the preference of the UE 0100 to IFOM over SIPTO. When the PDN-GW 0104 detects that the UE 0100 no longer uses IFOM, the PDN-GW 0104 notifies the AAA/HSS of the intention of the UE 0100. The AAA/HSS sets the SIPTO permission field in the subscription profile of the UE 0100 to Permit to change the subscription profile of the UE 0100. Next, the AAA/HSS updates the MME 0102 in the changed subscription profile of the UE 0100. When the MME 0102 confirms that the SIPTO permission field in the subscription profile of the UE 0100 is set to Permit, the MME 0102 can determine to trigger SIPTO for the UE 0100.

As described above, while the present invention has been illustrated and described in connection with the embodiments seemed to most practical and preferred in this specification, it will be apparent to those skilled in the art that the design of the present invention and the details of parameters can be changed in various ways without departing from the scope of the present invention. For example, all the aforementioned embodiments mention 3G and WLAN interfaces. However, it is important to understand that the present invention is applicable even when the UE has a different type of access technology and attaches to the network using such a different type of interface. Further, all the aforementioned embodiments mention a low-trusty non-3GPP access type using ePDG. However, it will be apparent to those skilled in the art that the present invention can also be applied to a high-trust non-3GPP access type (where the ePDG is modified into a gateway appropriate for the high-trust non-3GPP access type).

Further, all scenarios are associated with the 3GPP architecture. However, the problems and solutions described in this specification can also be applied to all different standard-setting organizations for deploying such different kinds of access networks and limiting a kind of mobility management mechanism used through a kind of access technology type. Further, in the present invention, the L-GW 0108 is illustrated as a separate entity in a system. However, the L-GW 0108 can be implemented as one function in the eNB 0107 so that the eNB 0107 and the L-GW 0108 will be made as a single entity. Furthermore, the 3GPP access radio network is illustrated to be managed by eNB. However, the 3GPP access radio network may also be managed by a home eNB or a home NB in the femto cell.

Each functional block used in the explanation of the aforementioned embodiments of the present invention can be realized as an LSI (Large Scale Integration) that is typically an integrated circuit. Each functional block can be individually formed into a single chip, or some or all of the functional blocks can be included and formed into a single chip. Although referred to here as the LSI, the integrated circuit may be referred to as an IC (Integrated Circuit), a system LSI, a super LSI, or an ultra LSI depending on differences in integration. The method of forming the integrated circuit is not limited to LSI and can be actualized by a dedicated circuit or a general-purpose processor. An FPGA (Field Programmable Gate Array) that can be programmed after LSI manufacturing or a reconfigurable processor of which connections and settings of the circuit cells within the LSI can be reconfigured may be used. Further, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

A path switching system, path switching method, and a mobile terminal according to the present invention are such that, if there is an additional connection of the UE to a first PDN-GW when the mobile terminal (UE) has been offloaded from the first PDN-GW to a second PDN-GW, processing for the additional connection can be decided and performed on the UE side, proving useful to a path switching system, a path switching method, and a mobile terminal upon switching between paths to exchange packets between the mobile terminal and a communication device as a communication partner of the mobile terminal.

The invention claimed is:

1. A mobile terminal used in a path switching system that switches a path used to exchange a packet in a communication session between the mobile terminal and a communication device as a communication partner of the mobile terminal through a network having a plurality of relay devices in connection with movement of the mobile terminal, the mobile terminal comprising:
    a receiving unit configured to receive a message from a control unit that performs connection management of the mobile terminal or a gateway device to which the mobile terminal is connected, wherein when switching between the relay devices to relay the packet to be exchanged during a first communication session between the mobile terminal and the communication device along with the movement of the mobile terminal, the message includes information indicative of having switched from a first relay device before the movement of the mobile terminal to a second relay device after the movement of the mobile terminal;
    a determining unit configured to determine, upon receiving the message, whether there is a second path other than a first path capable of being managed by the control unit, established between the mobile terminal before the movement and the first relay device, where the second path is incapable of being managed by the control unit, established between the mobile terminal before the movement and the first relay device; and
    a processing unit configured to perform predetermined processing on the second path, when there is the second path, based on information on a second communication session between the mobile terminal and the communication device, where the second communication session is different from the first communication session,
    a determination is made that a packet to be exchanged for the second communication session can be exchanged via a new path capable of being managed by the control unit, established between the mobile terminal and the second relay device, the processing unit performs processing for deleting the second path.

2. A mobile terminal used in a path switching system that switches a path used to exchange a packet in a communication session between the mobile terminal and a communication device as a communication partner of the mobile terminal through a network having a plurality of relay devices in connection with movement of the mobile terminal, the mobile terminal comprising:
    a receiving unit configured to receive a message from a control unit that performs connection management of the mobile terminal or a gateway device to which the mobile terminal is connected, wherein when switching between the relay devices to relay the packet to be exchanged during a first communication session between the mobile terminal and the communication device along with the movement of the mobile terminal, the message includes information indicative of having switched from a first relay device before the movement of the mobile terminal to a second relay device after the movement of the mobile terminal;
    a determining unit configured to determine, upon receiving the message, whether there is a second path other than a first path capable of being managed by the control unit, established between the mobile terminal before the movement and the first relay device, where the second path is incapable of being managed by the control unit, established between the mobile terminal before the movement and the first relay device; and
    a processing unit configured to perform predetermined processing on the second path, when there is the second path, based on information on a second communication session between the mobile terminal and the communication device, where the second communication session is different from the first communication session,
    a determination is made that a packet to be exchanged for the second communication session cannot be exchanged via a new path capable of being managed by the control unit, established between the mobile terminal and the second relay device, the processing unit performs processing for maintaining the second path.

3. A mobile terminal used in a path switching system that switches a path used to exchange a packet in a communication session between the mobile terminal and a communication device as a communication partner of the mobile terminal through a network having a plurality of relay devices in connection with movement of the mobile terminal, the mobile terminal comprising:
    a receiving unit configured to receive a message from a control unit that performs connection management of the mobile terminal or a gateway device to which the mobile terminal is connected, wherein when switching between the relay devices to relay the packet to be exchanged during a first communication session between the mobile terminal and the communication device along with the movement of the mobile terminal, the message includes information indicative of having switched from a first relay device before the movement of the mobile terminal to a second relay device after the movement of the mobile terminal;

a determining unit configured to determine, upon receiving the message, whether there is a second path other than a first path capable of being managed by the control unit, established between the mobile terminal before the movement and the first relay device, where the second path is incapable of being managed by the control unit, established between the mobile terminal before the movement and the first relay device; and a processing unit configured to perform predetermined processing on the second path, when there is the second path, based on information on a second communication session between the mobile terminal and the communication device, where the second communication session is different from the communication session, wherein the message further includes information indicative of having deleted the second path, and based on the information indicative of having deleted the second path, the processing unit performs processing, instead of the predetermined processing, that establishes a new path of a type identical to that of the second path between the first relay device and the mobile terminal, or that establishes a new path of a type identical to that of the second path between the second relay device and the mobile terminal.

* * * * *

UNITED STATES PATENT AND TRADEMARK OFFICE
CERTIFICATE OF CORRECTION

| | | |
|---|---|---|
| PATENT NO. | : 8,861,426 B2 | Page 1 of 1 |
| APPLICATION NO. | : 13/640308 | |
| DATED | : October 14, 2014 | |
| INVENTOR(S) | : Lim et al. | |

It is certified that error appears in the above-identified patent and that said Letters Patent is hereby corrected as shown below:

In the Claims

Column 40, Line 15, Claim 1:
"a determination is made that a packet to be exchanged for" should read, --wherein when a determination is made that a packet to be exchanged for--.

Column 40, Line 54, Claim 2:
"a determination is made that a packet to be exchanged for" should read, --wherein when a determination is made that a packet to be exchanged for--.

Signed and Sealed this
Third Day of February, 2015

Michelle K. Lee
*Deputy Director of the United States Patent and Trademark Office*